(12) United States Patent
Asukabe et al.

(10) Patent No.: US 8,325,268 B2
(45) Date of Patent: Dec. 4, 2012

(54) IMAGE PROCESSING APPARATUS AND PHOTOGRAPHING APPARATUS

(75) Inventors: Yuki Asukabe, Aichi (JP); Yukio Mori, Osaka (JP); Yasuhachi Hamamoto, Osaka (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 814 days.

(21) Appl. No.: 12/343,813

(22) Filed: Dec. 24, 2008

(65) Prior Publication Data

US 2009/0167928 A1  Jul. 2, 2009

(30) Foreign Application Priority Data

Dec. 28, 2007 (JP) ................................. 2007-339606
Sep. 23, 2008 (JP) ................................. 2008-243436

(51) Int. Cl.
*G03B 13/00* (2006.01)

(52) U.S. Cl. ........................................ 348/345; 348/370
(58) Field of Classification Search ............. 348/208.14, 348/208.3
See application file for complete search history.

(56) References Cited

U.S. PATENT DOCUMENTS

| | | | | |
|---|---|---|---|---|
| 2003/0071905 | A1* | 4/2003 | Yamasaki | 348/239 |
| 2004/0212725 | A1* | 10/2004 | Raskar | 348/370 |
| 2005/0195317 | A1* | 9/2005 | Myoga | 348/370 |
| 2007/0086675 | A1* | 4/2007 | Chinen et al. | 382/284 |
| 2007/0172141 | A1* | 7/2007 | Bando | 382/261 |
| 2008/0112644 | A1* | 5/2008 | Yokohata et al. | 382/278 |
| 2008/0291286 | A1* | 11/2008 | Fujiyama et al. | 348/222.1 |
| 2009/0160963 | A1* | 6/2009 | Kim | 348/220.1 |

FOREIGN PATENT DOCUMENTS

| | | |
|---|---|---|
| JP | 2001157107 | 6/2001 |
| JP | 2004328132 | 11/2004 |
| JP | 2005-229198 | 8/2005 |
| JP | 2005229198 | 8/2005 |
| JP | 2005341569 | 12/2005 |
| JP | 2007066199 | 3/2007 |
| WO | 9812868 | 3/1998 |

OTHER PUBLICATIONS

Soonmin Bae and Fredo Durand (Eurographics 2007 vol. 26 (2007), No. 3), "Defocus Magnification".*
Akira Kubota (IEEE Transaction on Image Processing, vol. 14 No. 11 Nov. 2005), "Reconstructing Arbitrarily Focused Images From Two Differently Focused Images Using Linear Filters".*
IEEE Transactions on Image Processing, vol. 14, No. 11.*
Eurographics 2007 vol. 26 (2007), No. 3.*
Soonmin Bae and Fredo Durand (Eurographics 2007 vol. 26 (2007), No. 3), "Defocus Magnification" Published Year 2007.*
Notification of Reasons for Refusal from corresponding Japanese Application 2008-243436; English translation included, May 24, 2010.

* cited by examiner

*Primary Examiner* — Jason Chan
*Assistant Examiner* — Abdelaaziz Tissire
(74) *Attorney, Agent, or Firm* — Novak Druce + Quigg, LLP

(57) ABSTRACT

An image processing apparatus includes an image processing circuit. The image processing circuit is configured by an image processing portion for performing an image process on a first image so as to generate a third image, an image composing portion for composing the first image and the third image, and an addition-ratio calculating portion for calculating a degree of composition of a composing process between the first image and the third image by the image composing portion based on a difference signal from a difference calculating portion.

4 Claims, 26 Drawing Sheets

(A) FIRST IMAGE (B) SECOND IMAGE (A) THIRD IMAGE (B) FOURTH IMAGE

ADDITION-RATIO CALCULATING FUNCTION (A) FIFTH IMAGE (B) SIXTH IMAGE (A) SEVENTH IMAGE (B) EIGHTH IMAGE (A) NINTH IMAGE (B) TENTH IMAGE (A) ELEVENTH IMAGE (B) TWELFTH IMAGE

IMAGE PROCESSING APPARATUS AND PHOTOGRAPHING APPARATUS

The present application claims priority to each of Japanese Patent Applications No. 2007-339606, which was filed on Dec. 28, 2007, and No. 2008-243436, which was filed on Sep. 23, 2008, and the same two applications being each hereby expressly incorporated herein by reference.

BACKGROUND OF THE INVENTION

1. Field of the Invention

The present invention relates to an image processing apparatus and a photographing apparatus, capable of obtaining a photographed image in which a subject focused by a photographer is emphasized.

2. Description of the Related Art

Currently, a photographing apparatus such as a digital camera and a digital video, using a solid-state imaging element such as a CCD (Charge Coupled Device) sensor and a CMOS (Complimentary Metal Oxide Semiconductor) sensor, is widely used.

By the way, in order to obtain a photographed image having a so-called "blurred taste" in which a specific subject is clearly photographed out of photographing targets, and the other subjects other than the specific subject are photographed in a so-called focus blurred state, and as a result, the specific subject is emphasized so as to stand out as a whole of the photographed image, it is necessary to use a photographing apparatus of a type in which a size of the solid-state imaging element or a diameter of a lens for forming the photographed image onto the solid-state imaging element is large, for example. According to this type of photographing apparatus, it is possible to photograph by making a depth of field sufficiently shallow, and thus, it is possible to obtain the photographed image having a so-called "blurred taste" in which the specific subject stands out.

However, when a photographing apparatus, such as a so-called compact type digital camera, of which the size of a solid-state imaging element or the diameter of a lens is small is used, it is not possible to photograph by making the depth of field sufficiently shallow, and thus, it is difficult to obtain the imaged image having a "blurred taste". Further, in either type of photographing apparatuses, it is difficult to obtain the photographed image in which a specific subject is emphasized by imparting a difference in luminance, a difference in chroma, etc., between the specific subject and the other subjects.

It is noted that according to a certain image processing apparatus, firstly, one reference image data is outputted by separating into individually independent two image data, i.e., image data of a subject area and image data of a background area. Then, the separated background image data is performed on a blurring process, and thereafter, the blurring-processed background image data and the reference image data are composed. After the composition, in order to prevent the generation of a strange feeling resulting from a saw-tooth shaped border line between the background area and the subject area, an anti-aliasing process is performed. As a result of a series of such processes, it becomes possible to obtain the image having a "blurred taste". Thus, although this image processing apparatus is able to obtain the image having a "blurred taste", a series of the above-described complicated processes are needed.

SUMMARY OF THE INVENTION

According to the present invention, an image processing apparatus for processing an object scene image outputted from an imager for capturing the object scene through a focus lens and an aperture mechanism, comprises: a focus adjuster for adjusting a focus in such a manner as to fit a specific object within the object scene; an aperture amount setter for setting a plurality of aperture amounts different to one another to the aperture mechanism in association with an adjusting process of the focus adjuster; a detector for detecting a magnitude of a difference in sharpness between a plurality of object scene images outputted from the imager corresponding to the plurality of aperture amounts set by the aperture amount setter; and an image quality adjuster for performing an image-quality adjusting process that refers to a detection result of the detector on the object scene image outputted from the imager corresponding to the focus adjusted by the focus adjuster.

Preferably, the detector includes a high-frequency component extractor for respectively extracting a plurality of high-frequency components from the plurality of object scene images, and a difference calculator for calculating a difference between the plurality of high-frequency components extracted by the high-frequency component extractor.

More, preferably, the detector further includes a luminance-component extractor for respectively extracting a plurality of luminance components from the plurality of object scene images, and a corrector for correcting a positional deviation between the plurality of object scene images based on the plurality of luminance components extracted by the luminance-component extractor.

Preferably, the image quality adjuster includes a specific parameter controller for greatly decreasing a specific parameter of the object scene image as the difference increases.

In an aspect, the image quality adjuster further includes a decreaser for decreasing the specific parameter of the object scene image, and a composer for composing output of the decreaser and the object scene image, and the specific parameter controller controls a composition ratio of the composer so that the specific parameter of the object scene image is greatly decreased as the difference increases.

In another aspect, the image quality adjuster further includes a decreaser for decreasing the specific parameter of the object scene image, an increaser for increasing the specific parameter of the object scene image in parallel with a decreasing process of the decreaser, and a composer for composing output of the decreaser and output of the increaser, and the specific parameter controller controls a composition ratio of the composer so that the specific parameter of the object scene image is greatly decreased as the difference increases.

In the other aspect, the image quality adjuster further includes a decreaser for decreasing the specific parameter of the object scene image, and the specific parameter controller increases a decreasing amount of the decreaser as the difference increases.

In an embodiment, the specific parameter includes sharpness.

In another embodiment, the specific parameter includes luminance.

In the other embodiment, the specific parameter includes chroma.

Preferably, further comprised are a first recorder for recording a plurality of object scene images outputted from the imager corresponding to a plurality of aperture amounts set by the aperture amount setter; and a first reproducer for reproducing the plurality of object scene images recorded by the recorder, wherein the detector notices the plurality of object scene images reproduced by the first reproducer, and the image quality adjuster notices one of the plurality of object scene images reproduced by the first reproducer.

More, preferably, the first recorder accommodates the plurality of object scene images into a common file.

Preferably, the image quality adjuster includes a defocus setter for setting the focus in a defocus state, and a composer for composing the object scene image outputted from the imager corresponding to a defocus set by the defocus setter and the object scene image outputted from the imager corresponding to the focus adjusted by the focus adjuster.

More preferably, further comprised are a second recorder for recording the plurality of object scene images outputted from the imager corresponding to the plurality of aperture amounts set by the aperture amount setter and the object scene image outputted from the imager corresponding to the defocus set by the defocus setter; and a second reproducer for reproducing the plurality of object scene images recorded by the recorder, wherein the detector and the image quality adjuster notice the plurality of object scene images reproduced by the second reproducer.

Further preferably, the second recorder accommodates the plurality of object scene images into a common file.

According to the present invention, an image processing program product executed by a processor of an image processing apparatus for processing an object scene image outputted from an imager for capturing the object scene through a focus lens and an aperture mechanism, comprises: a focus adjusting step of adjusting a focus in such a manner as to fit a specific object within the object scene; an aperture amount setting step of setting a plurality of aperture amounts different to one another to the aperture mechanism in association with an adjusting process of the focus adjusting step; a detecting step of detecting a magnitude of a difference in sharpness between a plurality of object scene images outputted from the imager corresponding to the plurality of aperture amounts set by the aperture amount setting step; and an image-quality adjusting step of performing an image-quality adjusting process that refers to a detection result of the detecting step on the object scene image outputted from the imager corresponding to the focus adjusted by the focus adjusting step.

According to the present invention, an image processing method for processing an object scene image outputted from an imager for capturing the object scene through a focus lens and an aperture mechanism, comprises: a focus adjusting step of adjusting a focus in such a manner as to fit a specific object within the object scene; an aperture amount setting step of setting a plurality of aperture amounts different to one another to the aperture mechanism in association with an adjusting process of the focus adjusting step; a detecting step of detecting a magnitude of a difference in sharpness between a plurality of object scene images outputted from the imager corresponding to the plurality of aperture amounts set by the aperture amount setting step; and an image-quality adjusting step of performing an image-quality adjusting process that refers to a detection result of the detecting step on the object scene image outputted from the imager corresponding to the focus adjusted by the focus adjusting step.

The above described features and advantages of the present invention will become more apparent from the following detailed description of the embodiment when taken in conjunction with the accompanying drawings.

DETAILED DESCRIPTION OF THE PREFERRED EMBODIMENTS

First Embodiment

A first embodiment of the present invention is described with reference to the drawings. The following description is made by taking a photographing apparatus, such as a digital camera and a digital video camera, which performs a photographing method in the present invention as an example. It should be noted that in the present invention, a photographing apparatus capable of photographing a still image and also a photographing apparatus capable of photographing a moving image may apply.

Hereinafter, "imaging" and "photographing" are used synonymous with each other below. In addition, an "image signal" may merely be described as an "image", but both of them are synonymous with each other.

Configuration of Imaging Apparatus

Figure 1:
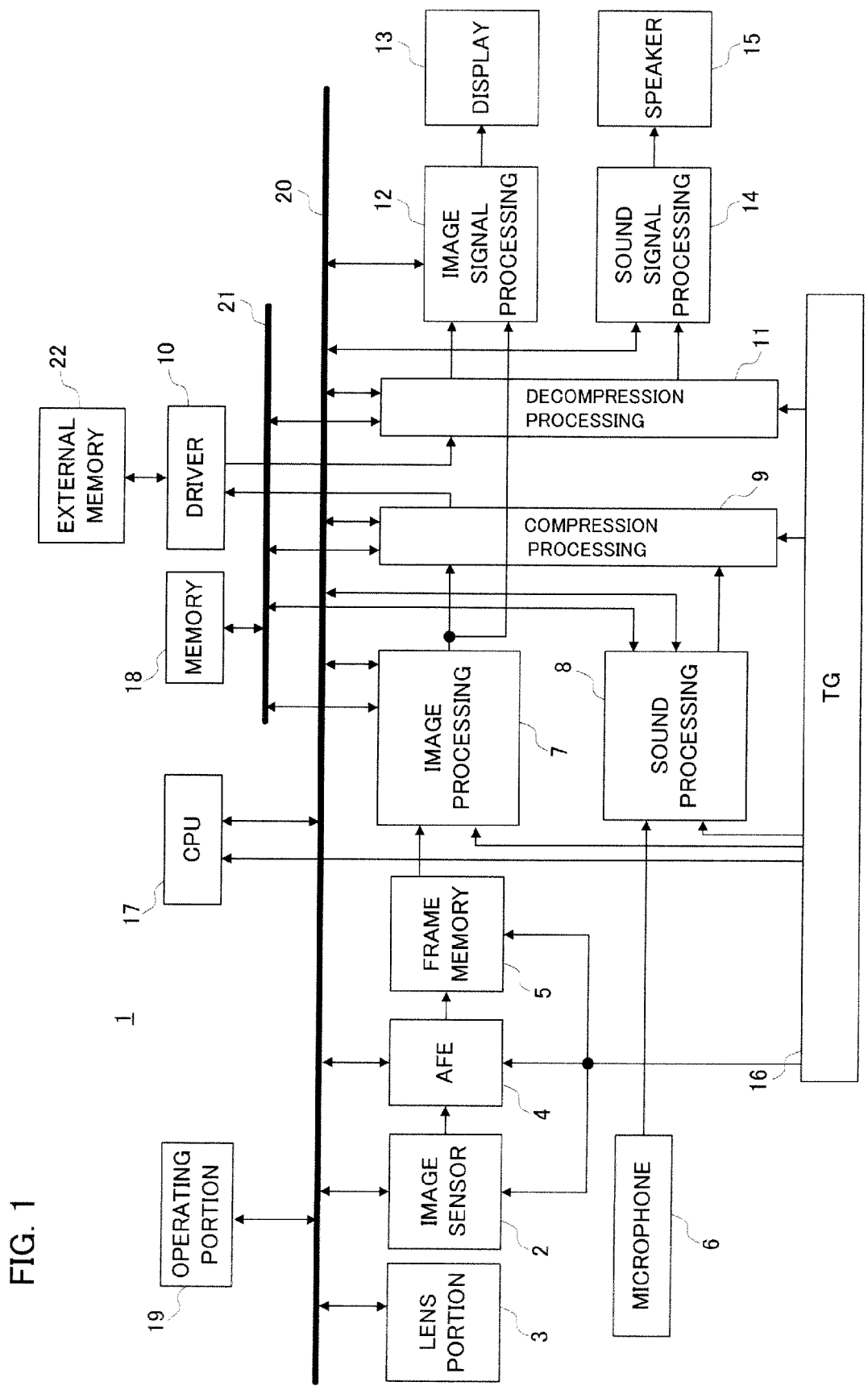
FIG. 1 is an entire configuration diagram of an imaging apparatus according to an embodiment of the present invention.

FIG. 1 is a block diagram showing an internal configuration of an imaging apparatus 1 according to a first embodiment.

In FIG. 1, the imaging apparatus 1 is provided with as an image sensor (solid-state imaging element) 2, such as a CCD sensor or a CMOS sensor, for converting an incident light into an electric signal, a lens portion 3 for forming an optical image of a subject onto the image sensor 2, an AFE (Analog Front End) 4 including an amplifying circuit (not shown) for amplifying an image signal or an analog electric signal outputted from the image sensor 2 and an A/D (Analog/Digital) converting circuit (not shown) for coveting the image signal into a digital image signal, a frame memory 5 for temporarily accommodating a plurality frames of digital image signals outputted from the AFE 4 in frame units, a microphone (hereinafter referred to as a "mic") 6 for converting a sound signal inputted from outside into an electric signal, an image processing portion 7 for performing an image process on the image signal from the AFE 4, a sound processing portion 8 for converting an analog sound signal from the mic 6 into a digital signal, which is subjected to a sound process, and a compression processing portion 9 for performing a compression encoding process of various systems such as a JPEG (Joint Photographic Experts Group) compression system to be performed on the image signal from the image processing portion 7 when a still image is photographed and an MPEG (Moving Picture Experts Group) compression system to be performed on the image signal from the image processing portion 7 and the sound signal from the sound processing portion 8 when a moving image is photographed.

Furthermore, the imaging apparatus 1 is provided with a driver portion 10 for recording a compression encoded signal compression-encoded by the compression processing portion 9 in an external memory 22 such as an SD card, a decompression processing portion 11 for decompressing the compression encoded signal read-out from the external memory 22 by the driver unit 10 so as to decode the same, an image-signal output portion 12 for converting the image signal acquired through the decoding in the decompression processing portion 11 into an analog signal, a display portion 13 including an LCD, etc., for displaying an image based on the image signal converted in the image-signal output portion 12, a sound-signal output portion 13 for converting the digital sound signal from the decompression processing portion 11 into an analog sound signal so as to output the same, and a speaker portion 15 for reproducing the analog sound signal from the sound-signal output portion 13.

Furthermore, the imaging apparatus 1 is provided with a TG (Timing Generator) 16 for outputting a timing control signal used to make an operating timing of each block coincident, a CPU (Central Processing Unit) 17 for controlling driving operations within the entire imaging apparatus, a memory 18 for storing each program for each operation and temporarily keeping data at the time of execution of the program, an operating portion 19 that includes a shutter button for photographing a still image and that is inputted with instructions from a user, a bus 20 for exchanging data between the CPU 17 and each of the blocks, and a bus 21 for exchanging data between the memory 18 and each of the blocks.

Figure 2:
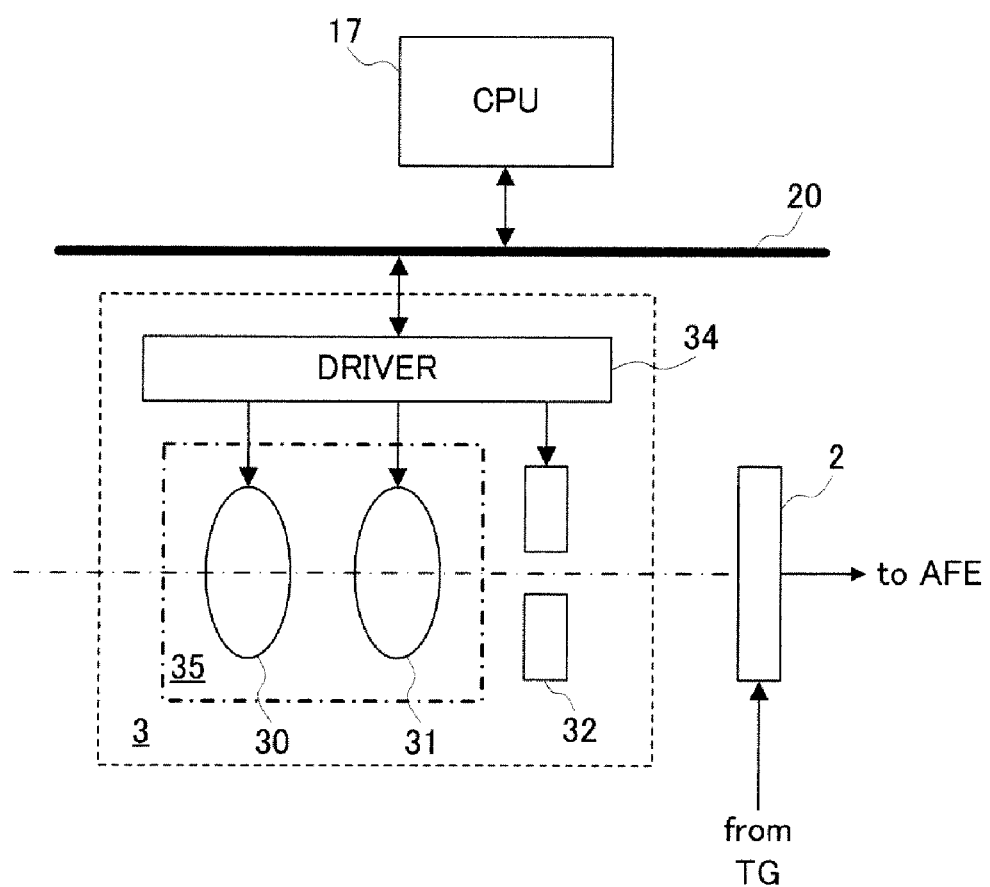
FIG. 2 is an internal configuration diagram of a lens portion 3 in FIG. 1.

FIG. 2 is an internal configurational diagram of the lens portion 3. The lens portion 3 includes an optical system 35 configured to include a plurality of lenses including a zoom lens 30 and a focus lens 31, an aperture 32, and a driver 34. The driver 34 is configured by a motor, etc., that are for realizing movements of the zoom lens 30 and the focus lens 31 and regulating of an amount of opening (in other words, a size of an opening portion) of the aperture 32.

The imaging apparatus 1 is provided with a so-called AF (Auto Focus) function of "forming an optical image representing a subject onto an imaging surface (may also be called a light-receiving surface) of the image sensor 2 by automatically controlling a position of the focus lens 31". According to this function, a point onto which the optical image representing the subject is formed is ideally coincident with the point on the imaging surface of the image sensor 2.

The AF function is realized in the following manner, for example. That is, an AF evaluation value detecting portion (not shown) provided in the image processing portion 7 extracts a predetermined high-frequency component from a luminance signal in the image signal. The CPU 17 controls the position of the focus lens 31 via the driver 34 according to a level (in other words, a size) of the high-frequency component thereby to form the optical image representing a subject onto the imaging surface of the image sensor 2.

Hereinafter, forming the optical image representing a subject onto the imaging surface of the image sensor 2 is described as "focusing on the subject".

Then, a state that a point onto which the optical image representing a subject is formed (the point may also be called a focal point) is coincident with a point on the imaging surface of the image sensor 2 is described as being focused. However, even when both of the points are not coincident, if the focus lens is within a range that the subject can clearly be photographed (in other words, the imaging surface of the image sensor 2 is positioned within a depth of focus), this state is described as being focused. On the contrary thereto, a not-focused state is described as "the focus is blurred".

The imaging apparatus 1 is able to focus on the subject with a so-called manual operation also. That is, when the operating portion 19 is applied a focusing operation from a photographer, the CPU 17 regulates the position of the focus lens 31 via the driver 34 according to the operation. Thereby, the photographer can focus on a desired subject.

The imaging apparatus 1 is provided with a so-called AE (Automatic Exposure) function of "maintaining brightness of the photographed image substantially constant by automatically controlling an amount of opening of the aperture 32, an exposure time of the image sensor 2, and an amplification factor of the AFE 4".

The AE function is realized in the following manner, for example. That is, an AE evaluation value detecting portion (not shown) provided in the image processing portion 7 integrates luminance signals in all pixels in the image signal outputted from the AFE 4. Next, the CPU 17 controls the amount of opening of the aperture 32 and the exposure time of the image sensor 2 via the driver 34, or controls the amplification factor of the image signal by the AFE 4 so that the integrated value (referred to as an AE evaluation value) is held at a previously set target value. Thereby, the AE function is realized.

When the optical image incident upon the image sensor 2 is the same, as the amount of opening of the aperture 32 is larger, an amount of light incident upon the image sensor 2 per unit time is increased, thereby increasing the value of the luminance signal. It is noted that when the AE evaluation value is less than the above-described target value even if the amount of opening of the aperture 32 is made maximum, the CPU 17 adjusts the amplification factor of the amplifying circuit of the AFE 12 to maintain the AE evaluation value at the target value.

The imaging apparatus 1 is able to regulate the amount of opening of the aperture 32 with a so-called manual operation also. That is, when an operation of changing the amount of opening of the aperture 32 (in other words, an operation of changing a depth of field) is applied to the operating portion 19 from the photographer, the CPU 17 regulates the amount of opening of the aperture 32 via the driver 34 according to the operation. Thereby, the photographer becomes able to photograph at a desired depth of field.

When the operation of changing the amount of opening is an operation of making the amount of opening larger, the depth of field becomes shallower, and when the operation of changing the amount of opening is an operation of making the amount of opening smaller, the depth of field becomes deeper.

It is noted that even when the amount of opening of the aperture 32 is changed by the operation of the photographer, if the exposure time of the image sensor 2 is regulated by the above-described AE function, the imaging apparatus 1 is able to maintain constant the luminance of the image signal outputted from the AFE 4.

In the imaging apparatus 1, when an operation of changing a zoom magnification is performed on the operating portion 19 by the photographer, the CPU 17 performs so-called zoom control of moving the zoom lens 30 along an optical axis via the driver 34 according to the operation. Thereby, the angle of view in the photographing by the image sensor 2 is changed (in other words, the image of the subject formed on the imaging surface of the image sensor 2 is enlarged or reduced).

Figure 3:
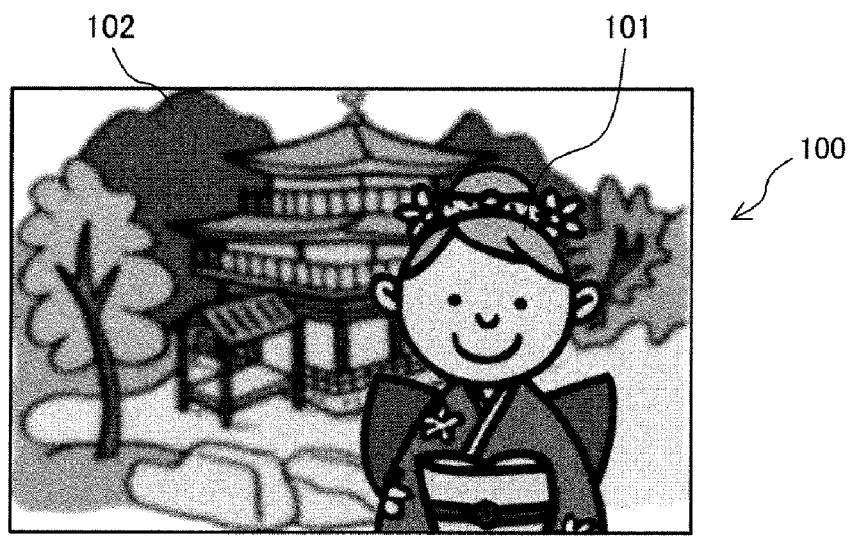
FIG. 3(A) is an image for describing a photographed image photographed by an imaging apparatus 1 in FIG. 1.
FIG. 3(B) is an image for describing another photographed image photographed by the imaging apparatus 1 in FIG. 1.
Figure 3:
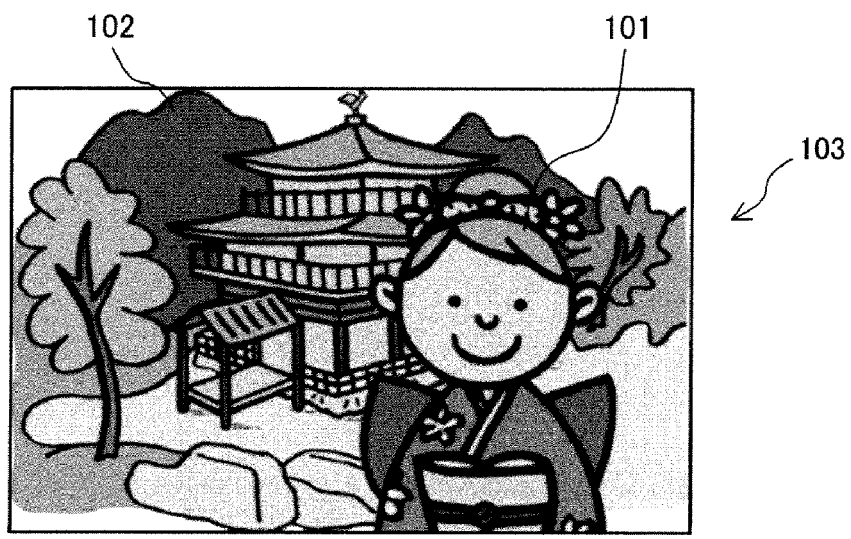

FIG. 3(A) and FIG. 3(B) show two photographed images obtained by photographing such that the same subject is focused on and the depth of field is differed. A photographed image 100 in FIG. 3(A) and a photographed image 103 in FIG. 3(B) are acquired by photographing the same photographing target twice.

The photographing target herein is a group of subjects planned to be obtained as a photographed image.

Each of the photographed images 100 and 103 is a photographed image representing a photographing target made up of a person 101 and a background 102 except for the person 101, such as a building, trees, and a pond.

Each of the photographed images 100 and 103 is a photographed image photographed by focusing on the person 101, which is the same subject.

Furthermore, the photographed image 100 is a photographed image photographed with the amount of opening of the aperture 32 being so regulated that the depth of field relatively becomes shallower. Thus, in the photographed image 100, the focus of the background 102 is blurred, so that the background 102 is an unclear and blurred image. That is, when the depth of field is shallow, sharpness of the background 102 is lowered.

On the other hand, the photographed image 103 is an image photographed with the amount of opening of the aperture 32 being so regulated that the depth of field is made deeper than that of the photographed image 100. Thus, in the photographed image 103, even the background 102 is focused, so that the background 102 becomes a clear image. That is, as the depth of field becomes deeper, the sharpness of the background 102 is increased.

In this embodiment, the two photographed images acquired by photographing the photographing target twice, which are two photographed images photographed in a state that both of the photographed images are photographed with a specific subject being focused, and with respect to a subject other than the specific subject (i.e., a background), one of the photographed images is photographed in a blurred focus state while the other is photographed in a focused state, are to be called "two photographed images photographed by focusing on the same subject and differing the depth of field".

In this embodiment, two imaged images which are photographed with the specific subject being focused and of which the backgrounds in the both images are in a focus blurred state but a degree of blurring of the focus differs to each other are also called "two photographed images photographed in such a manner that the same subject is focused and the depth of field is differed".

In addition, each of a plurality of photographed images photographed with the same subject being focused, and of which the depth of field is differed is merely called a "photographed image of which the depth of field differs".

The imaging apparatus 1 in FIG. 1 can relatively easily generate from a photographed image an image in which a specific subject is more emphasized than a background (hereinafter described as a specific-subject-emphasized image) by the image process in the image processing portion 7 even if a size of the image sensor 2 or a lens diameter of a lens configuring the lens portion 3 is small. More specifically, the imaging apparatus 1 photographs the same photographing target for two consecutive times thereby to obtain the photographed image 100 shown in FIG. 3(A) and the photographed image 103 shown in FIG. 3(B), for example. Then, from these two photographed images, a specific-subject-emphasized image can be generated.

Hereinafter, the internal configuration of the image processing portion 7 and the specific-subject-emphasized image generating process are described.

Figure 4:
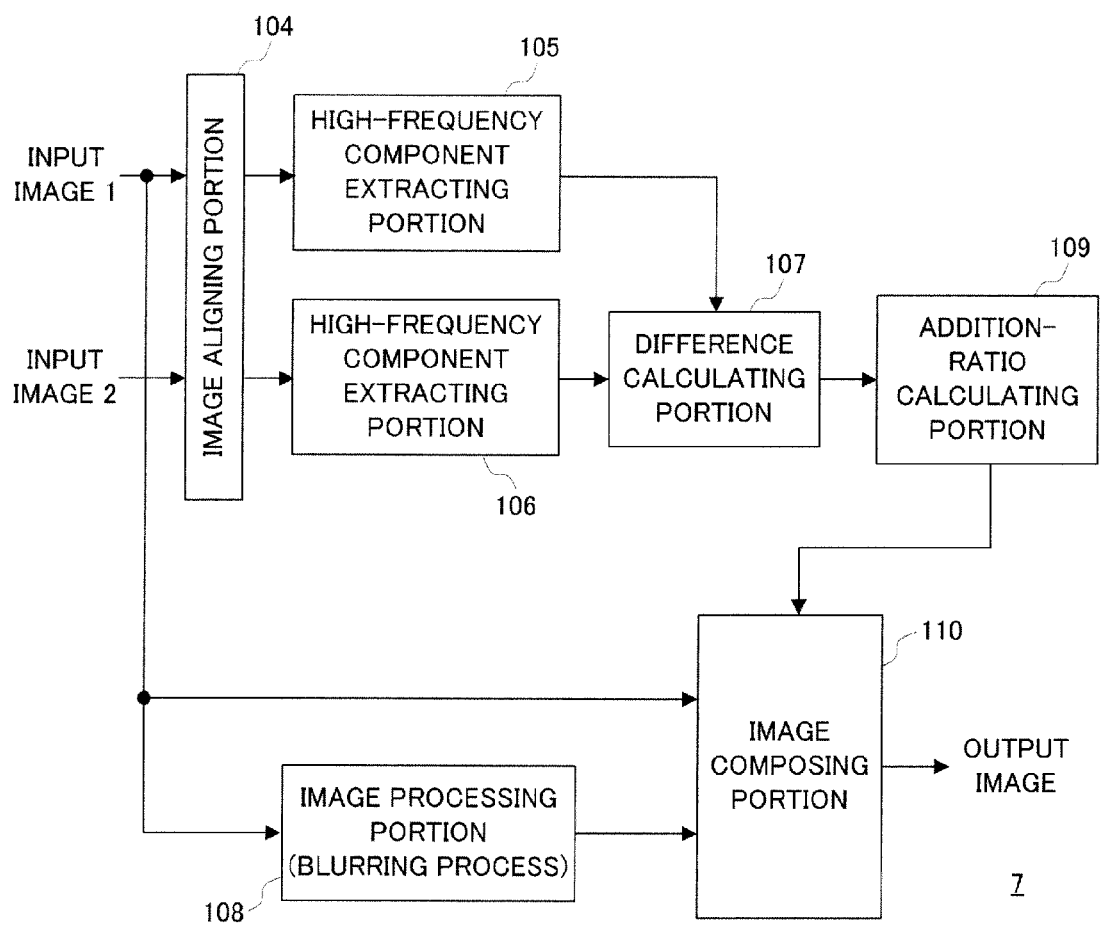
FIG. 4 is a diagram for describing one portion of an internal configuration and an image process of an image processing portion 7 in FIG. 1.

Internal Configuration of the Image Processing Portion 7 and the Specific-Subject-Emphasized Image Generating Process FIG. 4 is a diagram describing a configuration for a portion which performs the specific-subject-emphasized image generating process within the configuration provided in the image processing portion 7, and the specific-subject-emphasized image generating process.

FIG. 4 shows, in particular, a process for generating a specific-subject-emphasized image which exhibits a visual effect of causing the background 102 to appear blurred and causing the person 101 or specific subject to appear to stand out.

When the imaging apparatus 1 generates the specific-subject-emphasized image, the image processing portion 7 is inputted two (two frames of) photographed images different in depth of field as an input image 1 and an input image 2, respectively.

Hereinafter, consider a case that the photographed image 100 shown in FIG. 3(A) is inputted as the input image 1, and the photographed image 103 shown in FIG. 3(B) is inputted as the input image 2.

The photographed image 100 (hereinafter, described as a first image 100) and the photographed image 103 (hereinafter, described as a second image 103) are two frames of photographed images which are continuously photographed by the imaging apparatus 1, temporarily accommodated in the frame memory 5, and outputted to the image processing portion 7.

The image processing portion 7 is configured by an image aligning portion 104 for aligning the first image 100 and the second image 103, a high-frequency-component extracting portion 105 for extracting a high-frequency component (hereinafter, a high-frequency component of the luminance signal included in the image is merely described as a "high-frequency component of the image") of the luminance signal included in the first image 100 outputted from the image aligning portion 104, a high-frequency-component extracting portion 106 for extracting a high-frequency component of the second image 103 outputted from the image aligning portion 104, a difference calculating portion 107 for calculating a difference signal between the high-frequency component of the first image 100 outputted from the high-frequency-component extracting portion 105 and the high-frequency component of the second image 103 outputted from the high-frequency-component extracting portion 106, an image processing portion 108 for performing an image process on the first image 100 to generate a third image 111 shown in FIG. 5(A), an image composing portion 110 for composing the first image 100 and the third image 111, and an addition-ratio calculating portion 109 for calculating a degree of composition of the composing process between the first image 100 and the third image 111 by the image composing portion 110 based on the difference signal from the difference calculating portion 107.

When a positional relationship between the photographed image and the corresponding pixels is deviated between the first image 100 and the second image 103, the image aligning portion 104 detects this deviation and corrects the deviation for the second image 103. This deviation of the positional relationship occurs due to hand-shaking, for example. It is noted that the deviation correcting process may be performed on the first image 100. A detail of the image aligning process by the image aligning portion 104 is described later.

The high-frequency-component extracting portion 105 is configured by an HPF (High Pass Filter) having a characteristic such that a cut-off frequency is a tenth or more of Nyquist frequency, for example.

The high-frequency-component extracting portion 105 performs an HPF process thereby to extract the high-frequency component for each pixel.

Likewise, the high-frequency-component extracting portion 106 performs an HPF process on the luminance signal of the second image 103 on which the positional deviation correction is performed so as to extract the high-frequency component for each pixel.

The difference calculating portion 107 calculates a difference between the high-frequency component of the first image 100 and the high-frequency component of the second image 103 (a magnitude of a difference in sharpness between the first image 100 and the second image 103) for each pixel.

As described above, in both the first image 100 and the second image 103, the person 101 is focused. Then, in the first image 100, the background 102 is also focused, but in the second image 103, the background 102 is not focused. Accordingly, the difference between the high-frequency component of the image of the background 102 in the first image 100 and the high-frequency component of the image of the background 102 in the second image 103 is larger in value than the difference between the high-frequency component of the image of the person 101 in the first image 100 and the high-frequency component of the image of the person 101 in the second image 103.

That is, the difference between the sharpness of the background 102 in the first image 100 and the sharpness of the background 102 in the second image 103 is larger than the difference between the sharpness of the person 101 in the first image 100 and the sharpness of the person 101 in the second image 103.

The image processing portion 108 performs an image process on the first image 100. In FIG. 4, a process for exhibiting a blurring effect (hereinafter, described as a blurring process) is performed on the first image 100.

The third image 111 shown in FIG. 5(A) is an imaginary photograph after the image processing portion 108 performs the blurring process on the first image 100.

It is noted that the blurring process is realized by a smoothing process by an average filter, etc., for smoothing a gray scale change between adjacent pixel signals, for example, as described in "Digital Image Process" published by CG-ARTS Society (2nd ed. and 2nd print) on pages 108 to 110, or by an LPF (Low Pass Filter) process for leaving a low-frequency component and eliminating a high-frequency component out of a spacial frequency component included in the image signal as described in the same publication on pages 131 to 133. That is, the third image 111 shown in FIG. 5(A) is acquired by performing the average filter process or the LPF process on the first image 100, for example.

The addition-ratio calculating portion 109 deduces an addition ratio K representing the degree of composition between the first image 100 and the third image 103, for each pixel, based on the result of the difference by the difference calculating portion 107.

Figure 6:
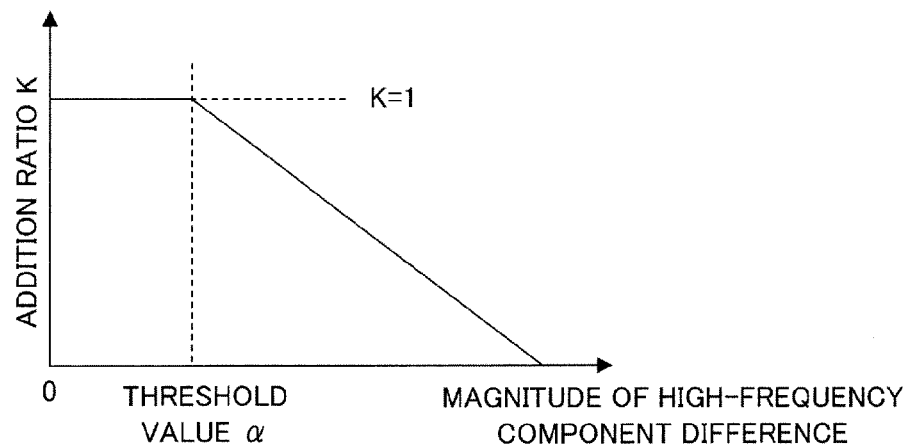
FIG. 6 is a graph showing a function for an addition ratio calculation by an addition-ratio calculating portion in FIG. 4.

FIG. 6 is a graph of a function representing a relationship between the magnitude of the difference value for each pixel between the high-frequency component of the first image 100 and the high-frequency component of the second image 103 and the addition ratio K.

It is noted that the magnitude of the difference value between the high-frequency components corresponds to the "degree of difference" in the present invention, and the larger the difference value, the higher the degree of difference. The degree of difference only needs to indicate a differing degree between two image signals, such as the magnitude of the difference value between the high-frequency components used in this embodiment, and as another example, a correlation function between the high-frequency component of the first image 100 and the high-frequency component of the second image 103 may be used as the degree of difference, for example.

In FIG. 6, the addition ratio K indicates "1" when the magnitude of the difference value between the high-frequency components is equal to or less than a threshold value α, and the addition ratio K becomes linearly smaller as the magnitude of the difference value between the high-frequency components is larger than the threshold value α.

The addition-ratio calculating portion 109 calculates the addition ratio K from the magnitude of the difference value between the high-frequency components according to the function shown in FIG. 6, but the addition ratio K with respect to the difference value between the high-frequency components may be provided in advance in the image processing portion 7 as a table.

The image composing portion 110 composes the first image 100 and the third image 111 based on the addition ratio K deduced by the addition-ratio calculating portion 109, and generates an output image, i.e., the specific-subject-emphasized image.

A fourth image 112 shown in FIG. 5(B) is an imaginary photograph of the specific-subject-emphasized image outputted from the image composing portion 110.

The image composing portion 110 specifically generates the fourth image 112 for each pixel as an output image according to a weighted-addition process by the following equation (1).

$$\text{Fourth image 112} = (\text{first image 100} \times \text{addition ratio } K) + (\text{third image 111} \times (1 - \text{addition ratio } K)) \quad (1)$$

With respect to the image of the person 101 in the first image 100 and the image of the person 101 in the third image 103, the difference value between the high-frequency components becomes smaller. Thus, the addition ratio K of each of the pixels corresponding to the image of the person 101 takes "1" or a value close to "1". Therefore, according to the equation 1, the image of the person 101 in the fourth image 112 is substantially equal to the image of the person 101 in the first image 100.

On the other hand, with respect to the image of the background 102 in the first image 100 and the image of the background 102 in the second image 103, as the difference value between the high-frequency components is larger than the threshold value α, the addition ratio K approaches zero. Therefore, the image of the background 102 in the first image 100 is mixed with the image of the background 102 in the third image 111, so that the image of the background 102 in the fourth image 112 becomes an image having a more blurring effect than that of the image of the background 102 in the first image 100.

As a result, the background 102 in the fourth image 112 becomes an image more blurred than the background 102 in the first image 100, and thereby, the fourth image 112 becomes an image in which the person 101 appears to stand out.

It is noted that in the above description, the difference between the high-frequency component of the first image 100 and the high-frequency component of the second image 103 after the positional deviation correction is calculated. However, since it suffices to calculate the degree of difference between the high-frequency components of the first image 100 and the second image 103 after the positional deviation correction, in place of the calculation of the difference, a ratio between the high-frequency components of the first image 100 and the second image 103 after the positional deviation correction may be calculated.

Furthermore, in the above description, the image processing portion 108 performs a blurring process on the first image 100 to generate the third image 111, and the image composing portion 110 composes the first image 100 and the third image 111 to generate the fourth image 112. However, even when an image generated by performing the blurring process on the second image is a third' image (not shown), and the second image 103 and the third' image are composed, an image which exhibits a similar effect can be obtained.

Herein, in FIG. 6, when the difference value between the high-frequency components is reflected on the addition ratio K which is the degree of composition between the first image 100 and the third image 111, the threshold value α of the addition ratio K is determined in view of whether or not a viewer is able to recognize the influence of the difference value on the fourth image 112 after the composition process. That is, the maximum value out of the values when the viewer becomes unable to recognize the influence of the difference value on the fourth image 112 is regarded as the threshold value α.

Likewise, a gradient (inclination) of the graph in FIG. 6 is also determined in view of whether or not the viewer can recognize the degree of change of the difference value on the fourth image 112.

Figure 5:
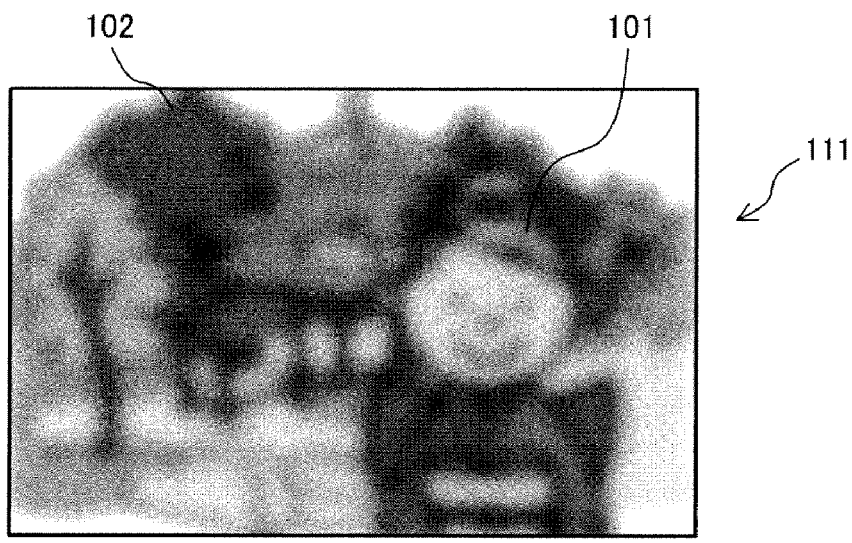
FIG. 5(A) is an imaginary photograph of an image after a blurring process is performed by an image processing portion 108 in FIG. 4.
FIG. 5(B) is an imaginary photograph of an output image from an image composing portion 110.
Figure 5:
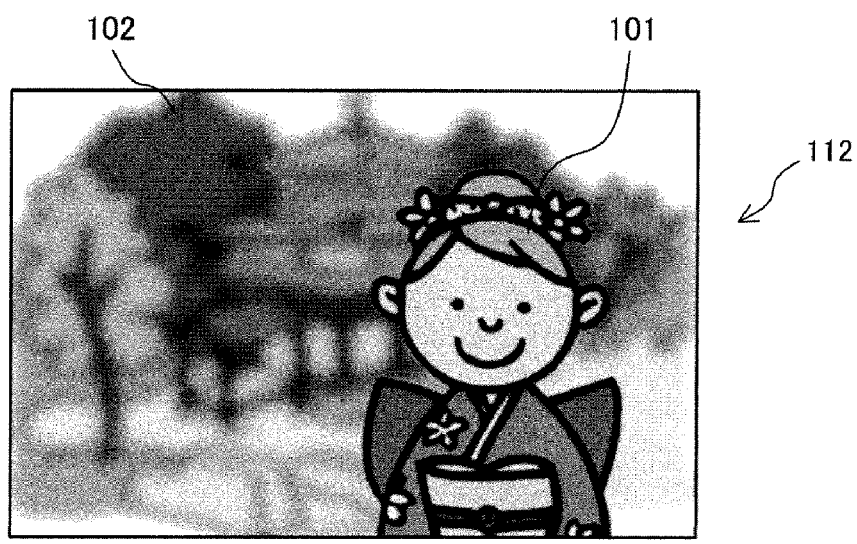

Therefore, FIG. 5 shows the function of which the value becomes linearly smaller as the value becomes larger than the threshold value α. However, rather than the linearly decreasing function, it may be possible to use a function of which the value diminishes as the difference value between the high-frequency components is increased.

Figure 7:
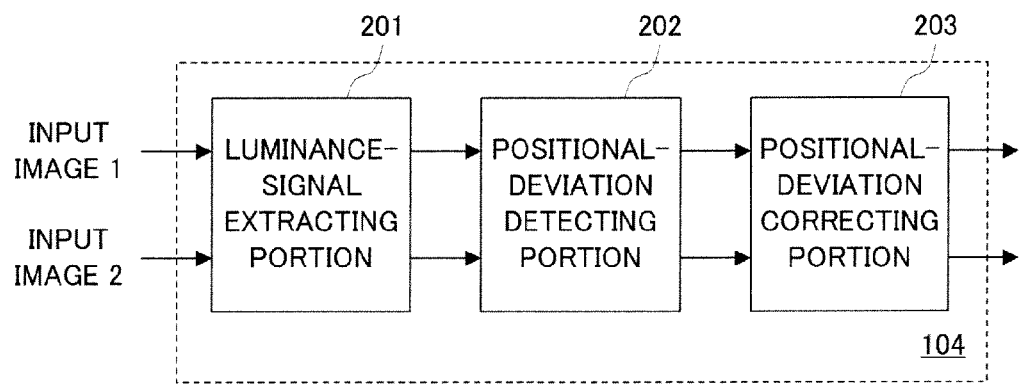
FIG. 7 is a diagram showing an internal configuration of an image aligning portion 104 in FIG. 4.

Internal Configuration of the Image-Alignment Processing Portion 104 and Aligning Process FIG. 7 is a diagram for describing an internal configuration of the image-alignment processing portion 104 and an image aligning process.

The image-alignment processing portion 104 is provided with a luminance-signal extracting portion 201 for extracting a luminance signal from each of the inputted first image 100 and second image 103, a positional-deviation detecting portion 202 for detecting the positional deviation between the first image 100 and the second image 103 based on the extracted luminance signal, a positional-deviation correcting portion 203 for performing a positional-deviation correcting process on the first image 100 based on the detected positional deviation.

When each pixel of the input image has signal values of IR, IG, and IB according to an RGB format, the luminance-signal extracting portion 201 calculates a magnitude Y of the luminance signal in each pixel according to the following equation (2) and outputs the same.

$$Y = 0.299 IR + 0.587 IG + 0.114 IB \quad (2)$$

The positional-deviation detecting portion 202 detects a motion vector between the first image 100 and the second image 103 based on a representative point matching method, which is a well-known technique, for example, when the luminance signal of the first image 100 and the luminance signal of the second image 103 are inputted.

The positional-deviation correcting portion 203 moves all the pixels of the first image 100 in such a direction as to cancel out a motion vector M, where M denotes a motion vector between the first image 100 and the second image 103 calculated by a positional-deviation detecting portion 202.

Figure 8:
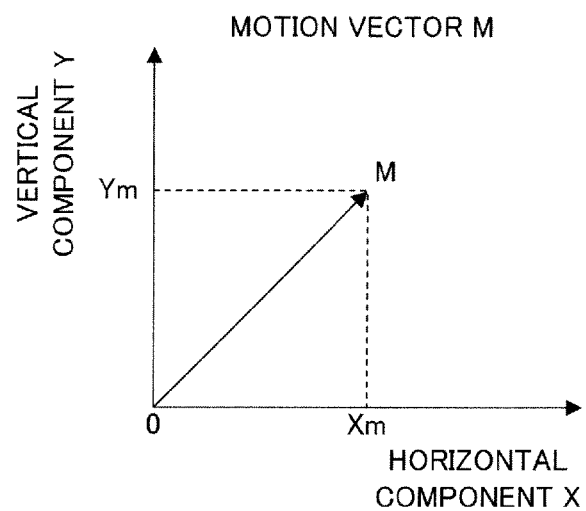
FIG. 8 is a graph for describing a positional deviation (motion vector) detected by a positional-deviation detecting portion 202 in FIG. 6.
Figure 9:
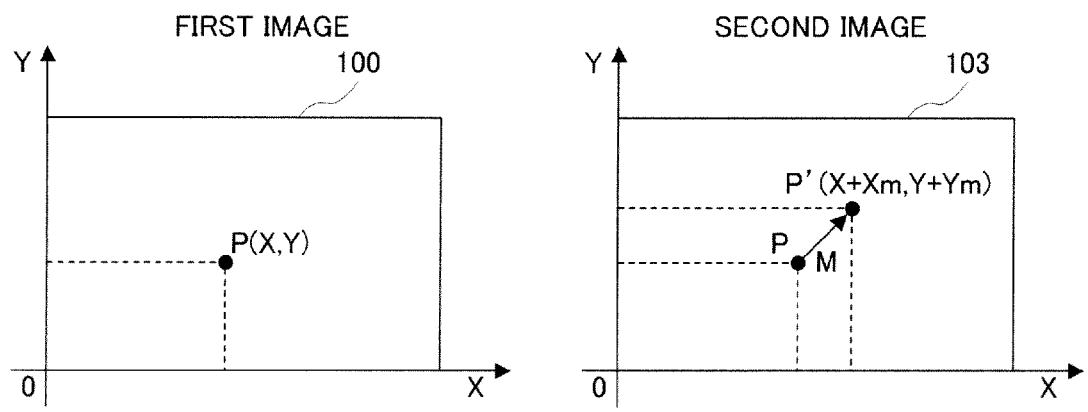
FIG. 9 are graphs each describing a positional deviation correction by a positional-deviation correcting portion 203 in FIG. 6.

Each of FIG. 8 and FIG. 9 is a graph describing the positional-deviation correcting process by the positional-deviation correcting portion 203.

FIG. 8 shows a horizontal component and a vertical component of the motion vector M between the first image 100 and the second image 103.

In FIG. 8, suppose that the motion vector M occurring between the first image 100 and the second image 103 is M (Xm, Ym). FIG. 9 shows a position of an image corresponding to a pixel P (X, Y) in the first image 100 moves to a position of a pixel P' (X+Xm, Y+Ym) in the second image 103 due to the occurrence of the motion vector M.

Therefore, the positional-deviation correcting portion 203 moves the pixel position P' (X+Xm, Y+Ym) on the second image 103 to the pixel position P (X, Y) on the first image 100.

That is, the positional-deviation correcting portion 203 converts the luminance signal of the second image 103 so that the luminance value at the pixel position P' (X+Xm, Y+Ym) on the second image 103 becomes the luminance value at the pixel position P (X, Y) so as to perform the positional-deviation correction.

The imaging apparatus 1 has a specific-subject-emphasized photographing mode for generating a specific-subject-emphasized image as described above in addition to a normal still-image photographing mode in still image photographing.

When the photographer photographs in the specific subject photographing mode, the imaging apparatus 1 continuously photographs by changing the depth of field thereby to obtain a plurality of photographed images different in depth of field, and also generates the specific-subject-emphasized image from the plurality of photographed images different in depth of field. Then, the plurality of acquired photographed images different in depth of field and the generated specific-subject-emphasized image are recorded in the external memory 22.

More specifically, when a photographing operation is performed on the operating portion 19 by the photographer, the imaging apparatus 1 focuses on a subject (person 101) noticed by the photographer by the AF function. Successively, after an adjustment of the amount of opening of the aperture 32 by the AE function, an adjustment of the exposure time (shutter speed) of the image sensor 2, and an adjustment of a hue by an AWB (Auto White Balance) function are performed, photographing (first photographing) is performed.

Herein, the AWB function is a function, provided in the imaging apparatus 1, of determining a light source of light with which the subject is irradiated, automatically determining a hue of a white color according to the light source, and also determining a hue of another color according to the hue of the white color.

Subsequent to the first photographing, the imaging apparatus 1 adjusts the amount of opening of the aperture 32 such that the depth of field becomes deeper than that of the first photographing so as to perform photographing (second photographing).

It is noted that to what degree the depth of field is differed between the first photographing and the second photographing can be set in advance according to preference of the photographer.

After the first photographing and the second photographing, the imaging apparatus 1 generates the specific-subject-emphasized image (fourth image 112 in FIG. 5(B)) based on the image (photographed image 100 in FIG. 3(A)) acquired by the first photographing and the image (photographed image 103 in FIG. 3(B)) acquired by the second photographing, and records a total of three images in the external memory 22.

It is noted that the photographing order of the first photographing and the second photographing may be reversed.

Furthermore, in order to obtain an image having a depth of field different from that of the image acquired by the first photographing, a plurality of times of photographing (a third photographing, a fourth photographing, . . . ) in addition to the second photographing may be performed. In this case, the CPU 17 is to select the two photographed images suitable for generating the specific-subject-emphasized image from the plurality of photographed images different in depth of field accumulated in the frame memory 5.

Photographing Operation by the Imaging Apparatus 1

Next, a method of obtaining an image in which the specific subject is emphasized by using the imaging apparatus 1 according to this embodiment is described.

Figure 10:
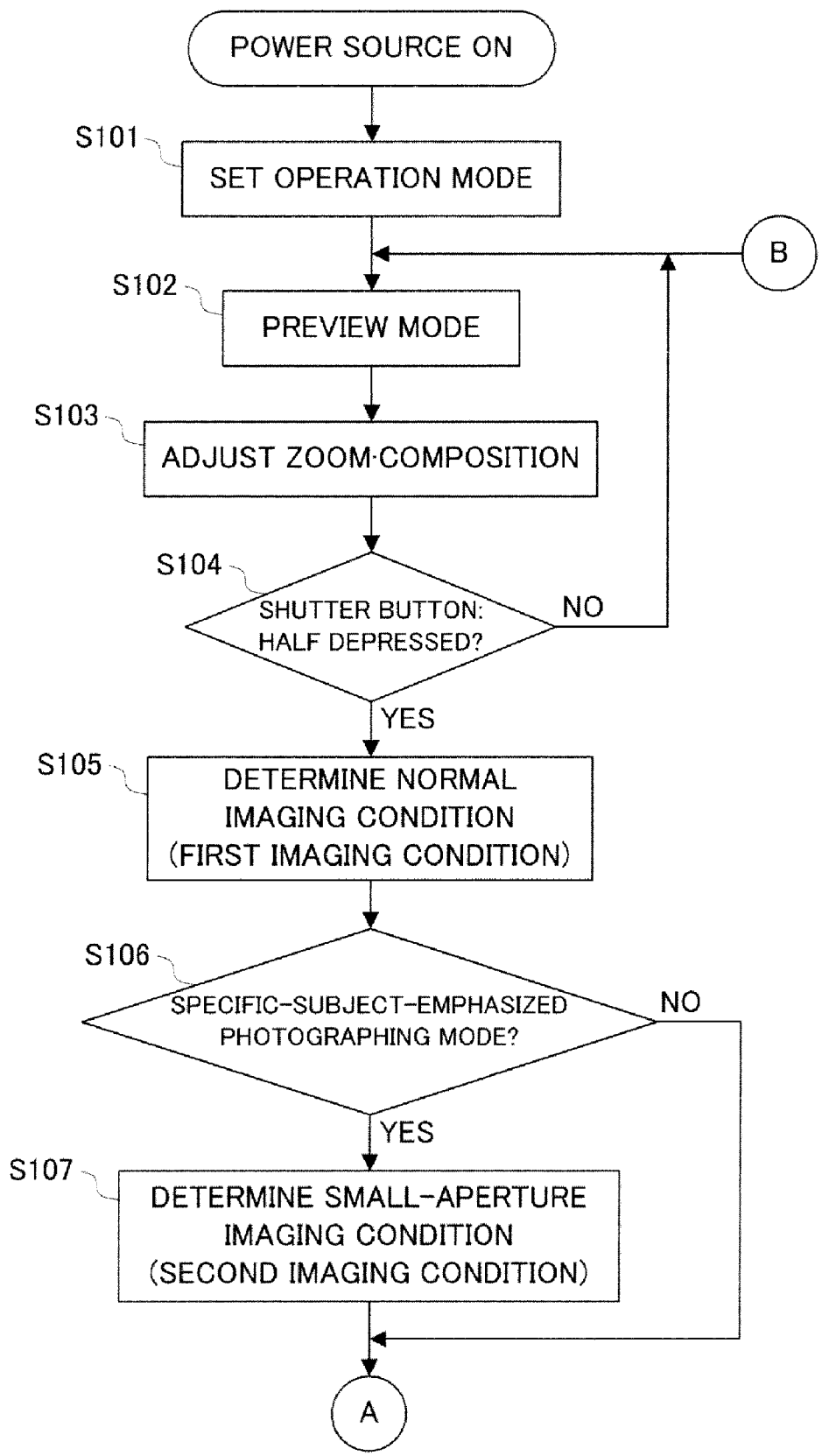
FIG. 10 is a flowchart showing one portion of a procedure for generating a specific-subject-emphasized image in the imaging apparatus in FIG. 1.

FIG. 10 is a flowchart showing a series of processes from the imaging apparatus 1 obtains the first image 100 (photographed image 100 in FIG. 3(A)) and the second image 103 (photographed image 103 in FIG. 3(B)) until it generates the fourth image 112 in FIG. 5(B) in which the specific subject is enhanced.

It is noted that a control program corresponding to the flowchart is stored in a flash memory not shown. Furthermore, an operation in each step to be described later always involves the CPU 17.

When the power source of the imaging apparatus 1 is turned on, the process proceeds to a step S101.

In the step S101, the photographer selects an operation mode of the imaging apparatus 1. The imaging apparatus 1 has a photographing mode for photographing a moving image and a still image and a reproducing mode for reproducing the photographed image that is already photographed and is recorded in the external memory 22.

Herein, suppose that the photographer selects the photographing mode, and also the specific-subject-emphasized photographing mode is selected.

In a step S102, the imaging apparatus 1 moves to a preview mode.

In the preview mode, an analog image signal acquired by a photoelectronic conversion in the image sensor 2 by way of the lens portion 3 is converted into a digital image signal in the AFE 4 and the converted digital image signal is outputted to the image processing portion 7. Then, in the image processing portion 7, the digital image signal is subjected to an image process such as a white balance process, and the resultant signal is displayed on the display portion 13 through the image-signal output portion 12.

In a step S103, a composition and a zoom magnification of a photographing target are adjusted in response to an operation by the photographer.

In a step S104, the CPU 17 determines whether or not the shutter button of the operating portion 19 is subjected to so-called half-depression.

The operating portion 19 of the imaging apparatus 1 is provided with a shutter button (not shown) for a still image photographing. The shutter button is a two-level switch, and when the photographer pushes the shutter button approximately half as much, a first switch is turned on. When the shutter button is pushed all the way (hereinafter, depressing of the shutter button all the way is described as "fully depress"), a second switch is turned on.

When it is determined that the shutter button is half-depressed, the process proceeds to a step S105. Otherwise, the process returns to the step S102 in which the imaging apparatus 1 continues the preview mode. In the step S105, a first photographing condition (normal imaging condition) is set to the photographing target. In a setting of the first photographing condition, the imaging apparatus 1 focuses on the subject (person 101) noticed by the photographer by the AF function, and performs setting the amount of opening of the aperture 32 by the AE function, setting the exposure time (shutter speed) of the image sensor 2, and setting a hue by the AWB function.

In a step S106, the CPU 17 of the imaging apparatus 1 determines whether or not the current still image photographing mode is the normal photographing mode or the specific-subject-emphasized photographing mode. When the specific-subject-emphasized photographing mode is determined, the process proceeds to a step S107, and otherwise, the process proceeds to a step S108.

In the step S107, the imaging apparatus 1 sets the second photographing condition (small-aperture imaging condition) to the photographing target. In a setting of the second photographing condition, the imaging apparatus 1 so sets that the amount of opening of the aperture 32 is smaller than that of the first photographing condition, i.e., so sets that the depth of field is made deeper.

It is noted that with respect to the second photographing condition, the photographer is also able to set in advance to what degree the amount of opening of the aperture 32 is made smaller than that of the first photographing condition. Thereby, the photographer is able to change the degree of emphasis of the person 101 according to his or her preference.

In the step S108, the CPU 17 determines whether or not the shutter button is fully depressed. In a step S109, the CPU 17 determines whether or not the operation of the shutter button is canceled.

When it is determined that the shutter button is fully depressed, the process proceeds to a step S110. When it is determined that the operation of the shutter button is canceled, the process returns to the step S102.

In the step S110, the imaging apparatus 1 photographs an object scene under the first photographing condition set in the step S105, and accommodates the first image 100 thereby obtained in the frame memory 5.

In a step S111, the CPU 17 of the imaging apparatus 1 determines whether or not the current still image photographing mode is the normal photographing mode or the specific-subject-emphasized photographing mode. When the specific-subject-emphasized photographing mode is determined, the process proceeds to a step S112, and otherwise, the process proceeds to a step S114.

In the step S112, the imaging apparatus 1 photographs the object scene under the second photographing condition set in the step S107, and accommodates a second image 103 thereby obtained in the frame memory 5.

In a step S113, the image processing portion 7 performs the specific-subject-emphasized image generating process to generate the fourth image 112, which is the specific-subject-emphasized image. Upon completion of the process, the process proceeds to the step S114.

The specific-subject-emphasized image generating process is described later.

In the step S114, under the control of the CPU 17, the image processing portion 7 performs the image process on the photographed image or the photographed image and the specific-subject-emphasized image, and then, the compression processing portion 9 performs the compression process on the resultant image, which is accommodated in the external memory 22. Then, the process returns to the step S102.

Specific-Subject-Emphasized Image Generating Process

Figure 12:
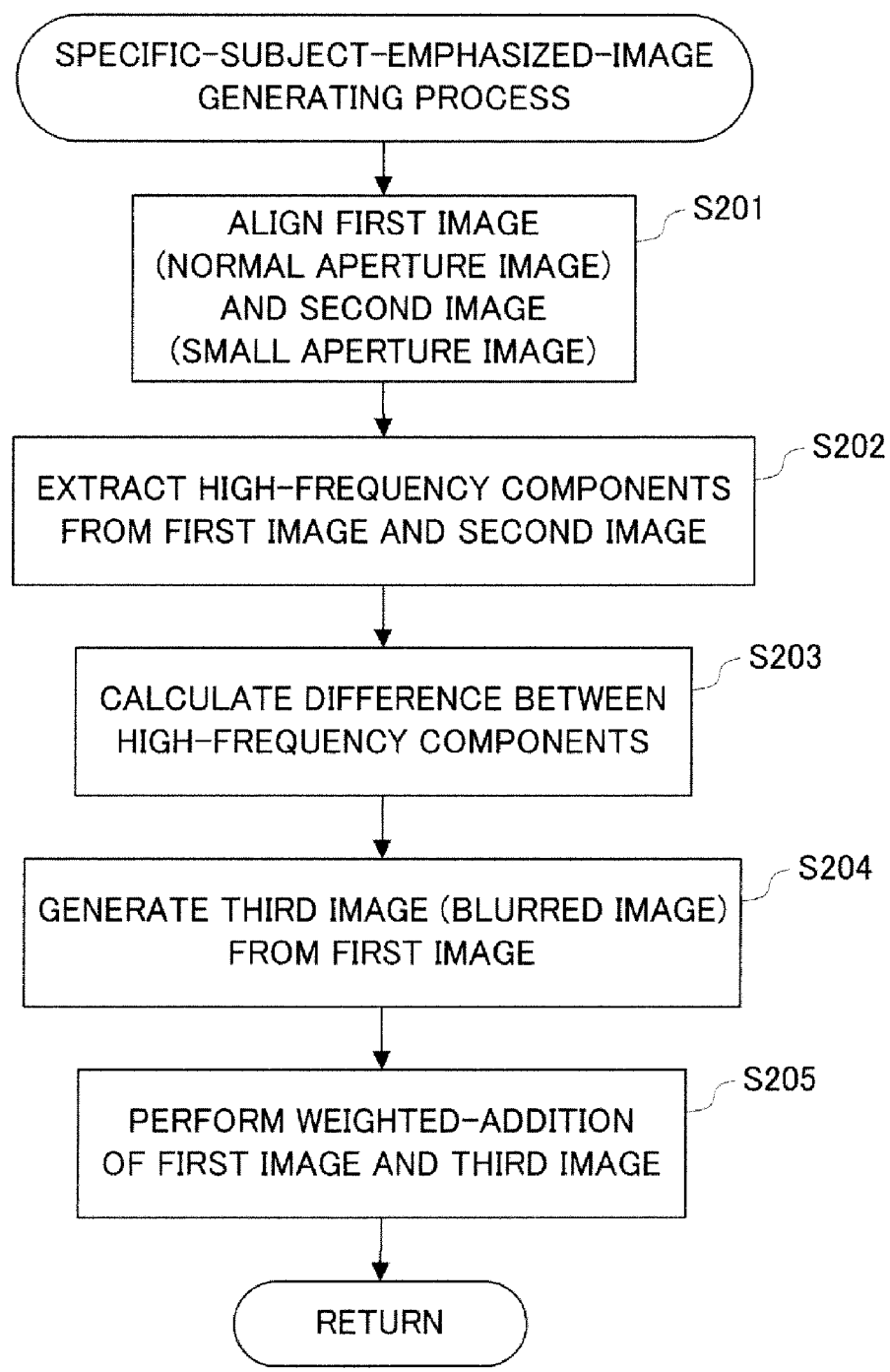
FIG. 12 is a flowchart showing a procedure for generating a specific-subject-emphasized image in a step S113 in FIG. 11.

FIG. 12 shows a flowchart showing a series of processes until the imaging apparatus 1 generates the fourth image 112 from the first image 100 and the second image 103.

In a step S201, the positional deviation between the first image 100 and the second image 103 that are outputted from the frame memory 5 is detected, and when the positional deviation is present, the positional-deviation correcting process is performed on the second image 103. Then, the process proceeds to a step S202.

In the step S202, the high-frequency components of the first image 100 and the positional-deviation corrected second image 103 are calculated. Then, the process proceeds to a step S203.

In the step S203, the difference between the high-frequency component of the first image 100 and the high-frequency component of the positional-deviation corrected second image 103 is calculated, and the addition ratio K is deduced with reference to the calculated difference.

In a step S204, the blurring process is performed on the first image 100 to generate the third image 111 shown in FIG. 5(A). Then, the process proceeds to a step S205.

In the step S205, the first image 100 and the third image 111 are subjected to weighted addition according to the addition ratio K so as to generate the fourth image 112 in which the person 101 is emphasized.

As described above, the photographer can obtain the fourth image 112, having the "blurred taste", by performing the process shown in FIG. 10 or that shown in FIG. 12 in which the background 102 is blurred and also the person 101 is emphasized so as to make the person 101 stand out.

Second Embodiment

Figure 13:
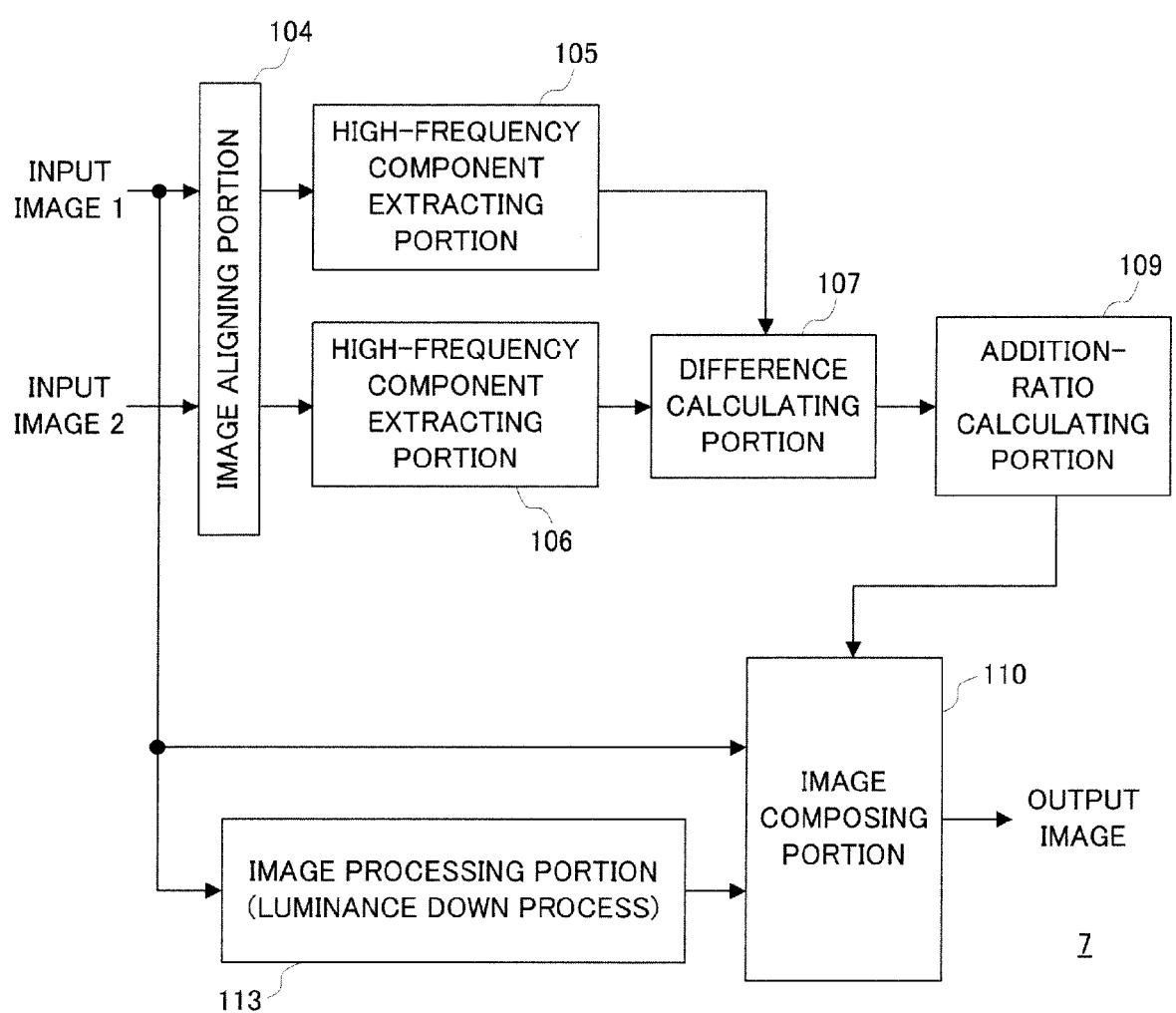
FIG. 13 is a diagram for describing an internal configuration and an image process of an image processing portion 7 in FIG. 1, in a second embodiment.

Subsequently, a second embodiment is described. FIG. 13 is a diagram for describing a configuration of a portion for performing the specific-subject-emphasized image generating process, out of a configuration provided in the image processing portion 7 according to a second embodiment, and the specific-subject-emphasized image generating process.

In the second embodiment, there is shown a method for obtaining a photographed image on which a process for decreasing luminance of the background 102 is performed, and as a result, luminance of the person 101 is relatively increased, and thus, the person 101 appears to stand out.

In FIG. 13, regions allotted with the same numerals as those in FIG. 4 are those having the same functions and operations as those in the first embodiment, and thus, the description of the functions and the operation is omitted.

An image processing portion 113 performs a process for exhibiting an effect for decreasing the luminance (hereinafter, described as a luminance decreasing process) on the first image 100 in FIG. 3(A).

A luminance value in each pixel of the first image 100 can be represented by the above-described equation (2).

The image processing portion 113 performs, as the luminance decreasing process, a process for decreasing the luminance at a constant proportion on each pixel of the first image 100.

Figure 14:
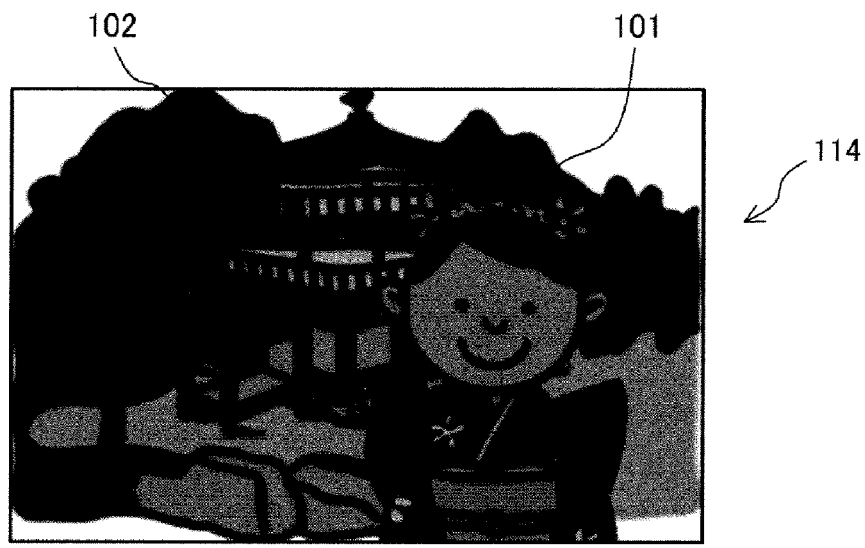
FIG. 14(A) is an imaginary photograph of an image after a luminance down process is performed by an image processing portion 113 in FIG. 13.
FIG. 14(B) is an imaginary photograph of an output image from an image composing portion 110.
Figure 14:
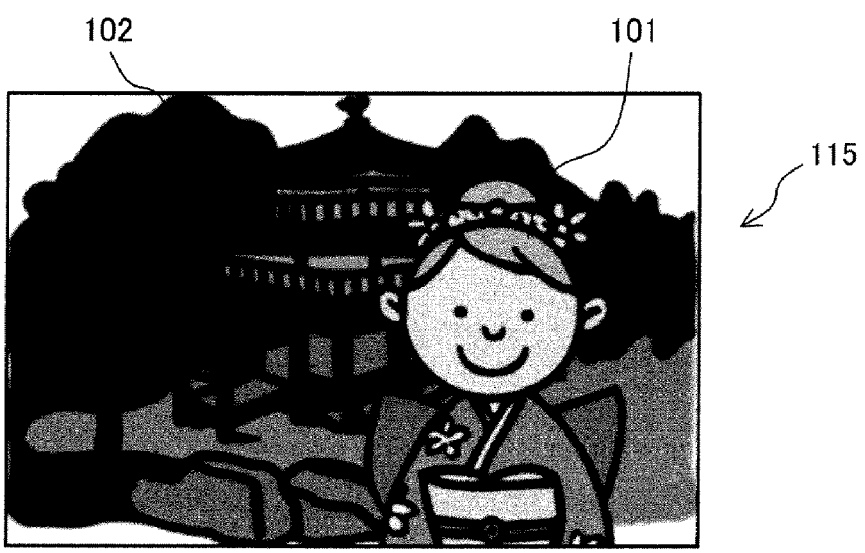

A fifth image 114 shown in FIG. 14(A) is an imaginary photograph of an image generated as a result of performing the luminance decreasing process on the first image 100.

The image composing portion 110 composes the first image 100 and the fifth image 114 based on the addition ratio K deduced by the addition-ratio calculating portion 109 by a weighted-addition process of an equation (3), and generates a sixth image 115 shown in FIG. 14(B) as an output image.

Sixth image 115=(first image 100×addition ratio K)+
(fifth image 114×(1−addition ratio K))      (3)

As a result, the background 102 in the sixth image 115 becomes an image of which the luminance is decreased more than that of the background 102 in the first image 100. This generates an image in which the person 101 appears to stand out.

Subsequently, a flowchart for obtaining the sixth image 115 is described.

FIG. 12 shows a flowchart for obtaining the fourth image 112 in the first embodiment. The same figure is used to describe a case that the sixth image 115 of the second embodiment is obtained. In this case, in a step S204 of the flowchart in FIG. 12, instead of the blurring process on the first image 100, a process for "performing the luminance decreasing process on the first image 100 so as to generate the fifth image 114" is executed.

Further, in the above-described description, the image processing portion 113 performs the luminance decreasing process on the first image 100 to generate the fifth image 114 of which the luminance is decreased, and the image composing portion 110 composes the first image 100 and the fifth image 114. However, even when the image processing portion 113 performs the luminance decreasing process on the second image 103 so as to generate a fifth' image (not shown) and the image composing portion 110 composes the fifth' image and the second image 103, it is still possible to obtain an image exhibiting a similar effect.

Thereby, the photographer is able to obtain the sixth image 115 in which the luminance of the background 102 is decreased so that the person 101 is emphasized to appear to stand out.

Third Embodiment

Figure 15:
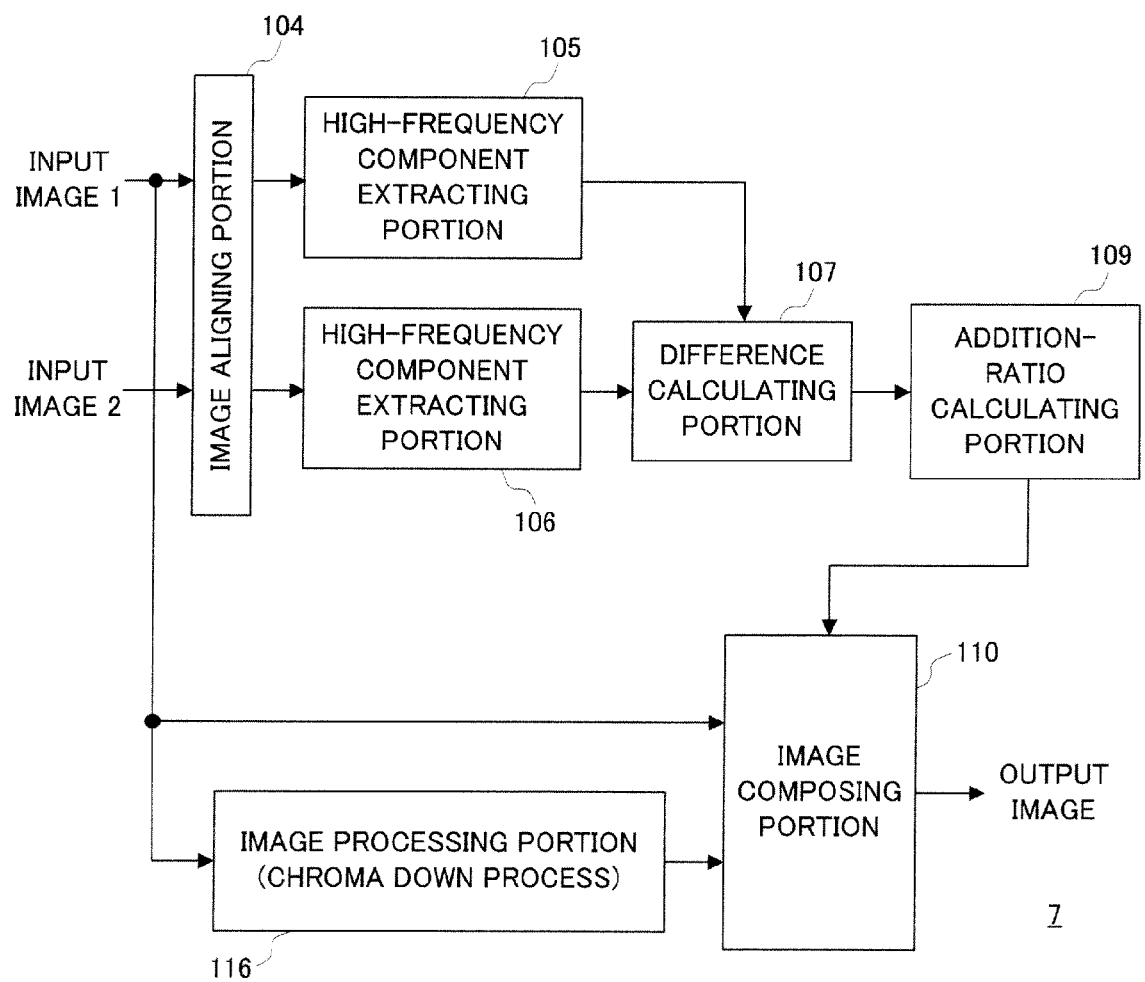
FIG. 15 is a diagram for describing an internal configuration and an image process of an image processing portion 7 in FIG. 1, in a third embodiment.

Subsequently, a third embodiment is described. FIG. 15 is a diagram for describing a configuration of a portion for performing the specific-subject-emphasized image generating process, out of a configuration provided in the image processing portion 7 according to a third embodiment, and the specific-subject-emphasized image generating process.

In the third embodiment, there is shown a method for obtaining a photographed image on which a process for decreasing chroma of the background 102 is performed, and as a result, chroma of the person 101 is relatively increased than that of the background 102, and thus, the person 101 appears to stand out.

In FIG. 15, regions allotted with the same numerals as those in FIG. 4 are those having the same functions and operations as those in the first embodiment, and thus, the description of the functions and the operation is omitted.

An image processing portion 116 performs a process for exhibiting an effect for decreasing the chroma (hereinafter, described as a chroma decreasing process) on the first image 100.

Figure 16:
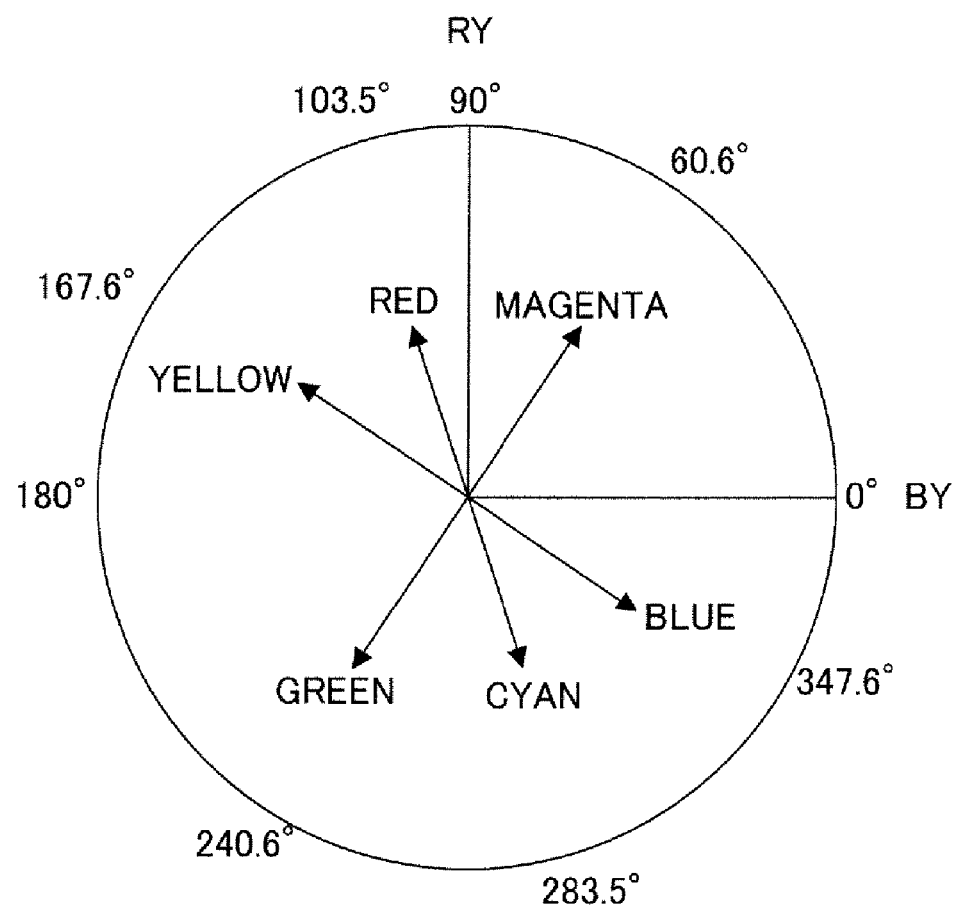
FIG. 16 is a chart showing a color correlation for describing a chroma.

Herein, the chroma means vividness of a color, and a purity of a color, and when the chroma is higher, the color becomes purer, and in contrary, when the chroma is lower, the color becomes cloudier (gray). A range of a value of the chroma is 0 to 100%. FIG. 16 shows a hue circle diagram. In a hue circle, hues are circularly arranged. In FIG. 16, the chroma is expressed by a length of an arrow. That is, when color difference signals in each pixel in the first image 100 are RY and BY, the chroma of each pixel in the first image 100 is calculated by an equation (4):

$$S=\sqrt{RY^2+BY^2} \quad (4)$$

Therefore, the image processing portion 113 performs, as the chroma decreasing process, a process for decreasing the chroma of each pixel at a constant proportion on each pixel of the first image 100.

Figure 17:
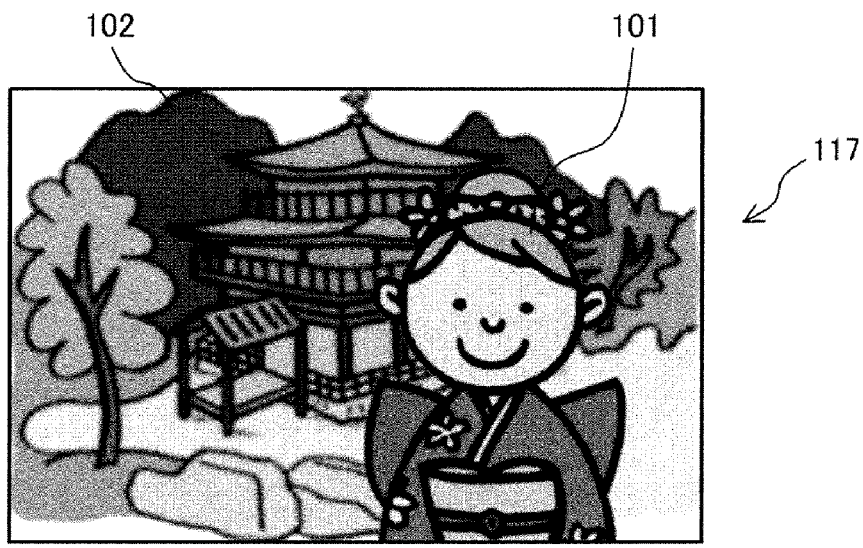
FIG. 17(A) is an imaginary photograph of an image after a chroma down process is performed by an image processing portion 116 in FIG. 15.
FIG. 17(B) is an imaginary photograph of an output image from an image composing portion 110.
Figure 17:
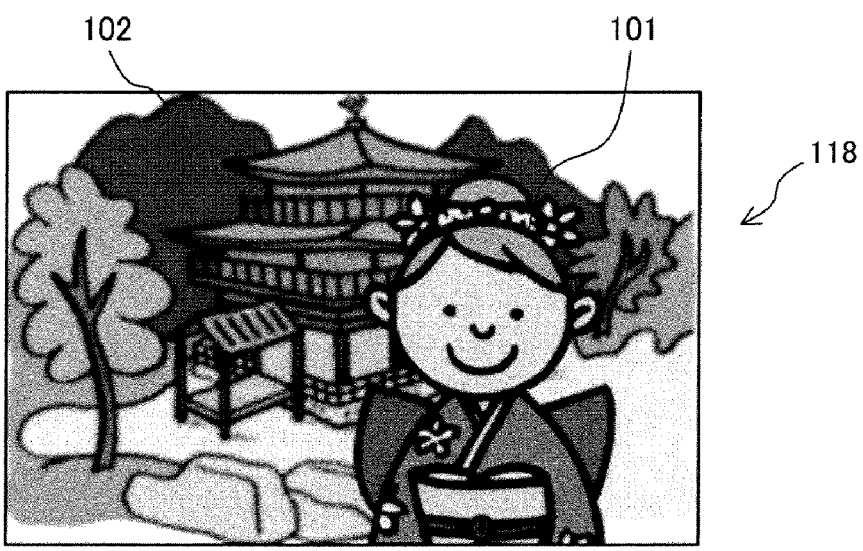

A seventh image 117 shown in FIG. 17(A) is an imaginary photograph of an image generated as a result of performing the chroma decreasing process on the first image 100.

The image composing portion 110 composes the first image 100 and the seventh image 117 based on the addition ratio K deduced by the addition-ratio calculating portion 109 by a weighted-addition process of an equation (5), and generates an eighth image 118 shown in FIG. 16(B) as an output image.

Eighth image 118=(first image 100×addition ratio K)+(seventh image 117×(1−addition ratio K))      (5)

As a result, the background 102 in the eighth image 118 becomes an image of which the chroma is decreased more greatly than that of the background 102 in the first image 100. This generates an image in which the person 101 appears to stand out.

Subsequently, a flowchart for obtaining the eighth image 118 is described.

FIG. 12 shows a flowchart for obtaining the fourth image 112 in the first embodiment. The same figure is used to describe a case that the eighth image 118 of the third embodiment is obtained. In this case, in the step S204 of the flowchart in FIG. 12, instead of the blurring process on the first image 100, a process for "performing the chroma decreasing process on the first image 100 so as to generate the seventh image 117" is executed.

Further, in the above-described description, the image processing portion 113 performs the chroma decreasing process on the first image 100 to generate the seventh image 117 of which the chroma is decreased, and the image composing portion 110 composes the first image 100 and the seventh image 117. However, even when the image processing portion 113 performs the luminance decreasing process on the second image 103 so as to generate a seventh' image (not shown) and the image composing portion 110 composes the seventh' image and the second image 103, it is still possible to obtain an image exhibiting a similar effect.

Thereby, the photographer is able to obtain the eighth image 118 in which the chroma of the background 102 is decreased so that the person 101 is emphasized so as to appear to stand out.

Modification of Second Embodiment

Figure 18:
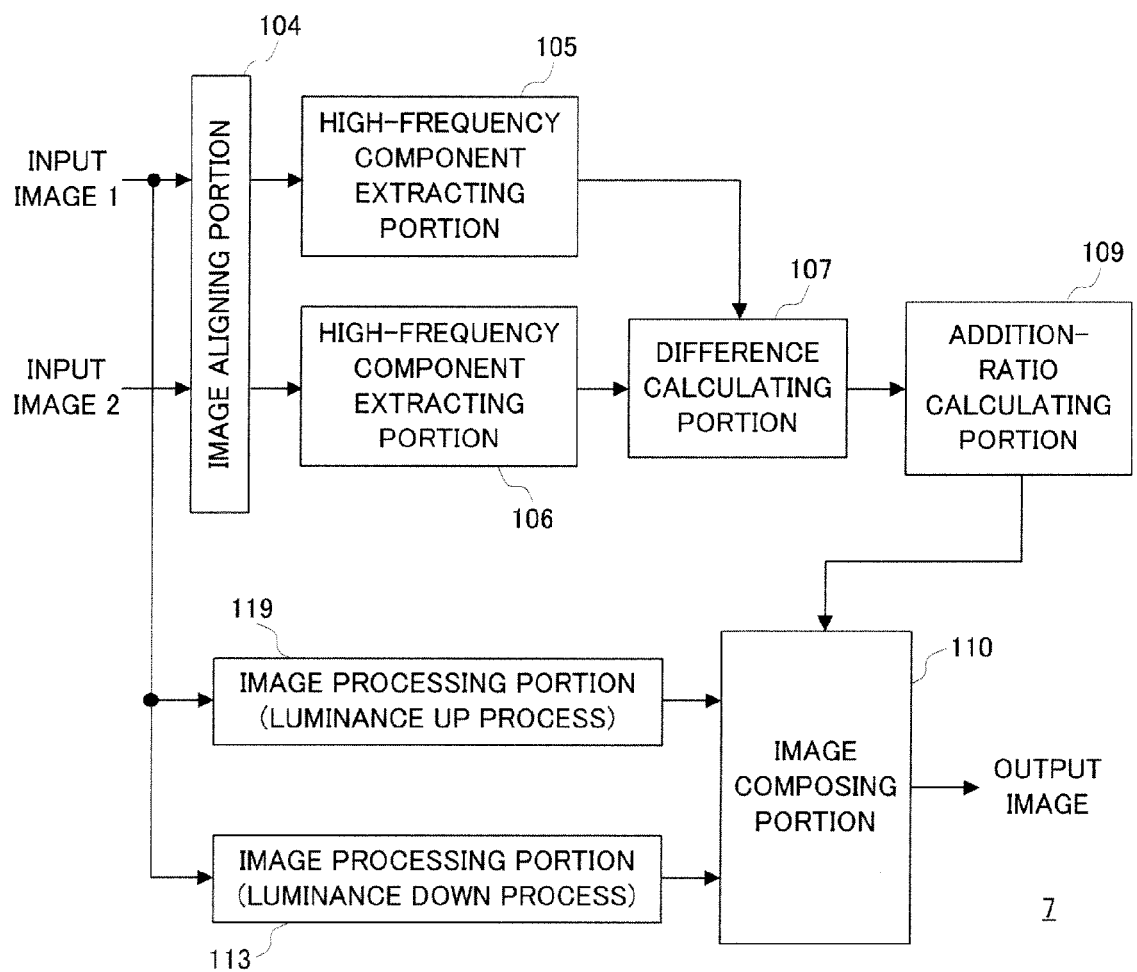
FIG. 18 is a diagram showing a modified example of the image processing portion 7 in the second embodiment.

FIG. 18 is a diagram describing a modified example of the second embodiment.

In FIG. 18, regions allotted with the same numerals as those in FIG. 4 are those having the same functions and operations as those in the first embodiment, and thus, the description of the functions and the operation is omitted.

In FIG. 18, an image processing portion 119 performs a process for exhibiting an effect for increasing the luminance (hereinafter, described as a luminance increasing process) on the first image 100.

Figure 19:
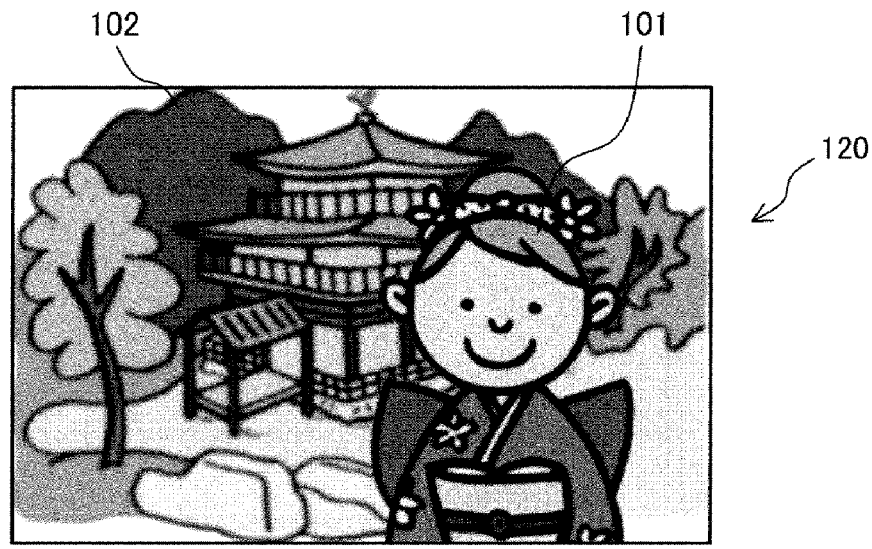
FIG. 19(A) is an imaginary photograph of an image after a luminance up process is performed by an image processing portion 119 in FIG. 18.
FIG. 19(B) is an imaginary photograph of an output image from an image composing portion 110.
Figure 19:
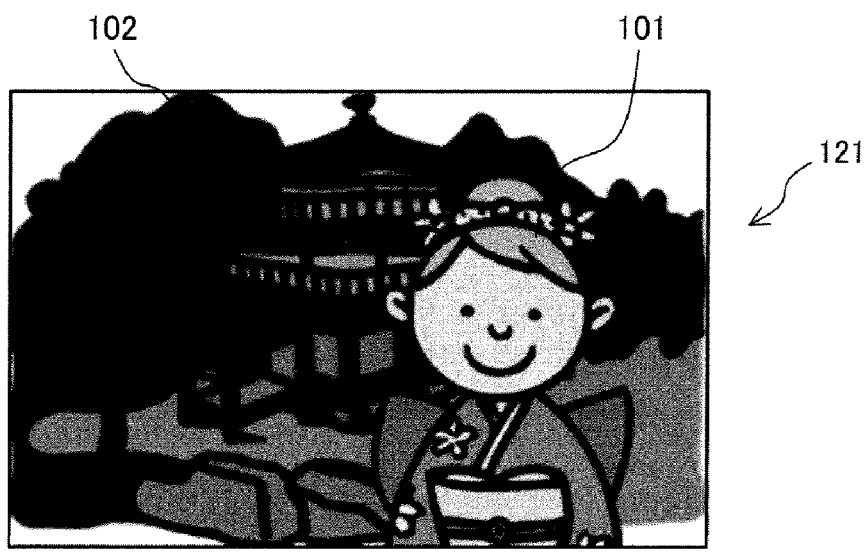

A ninth image 120 shown in FIG. 19(A) is an imaginary photograph of a case that the luminance increasing process is performed on the first image 100.

The image composing portion 110 composes the ninth image 120 and the fifth image 114 on which the luminance decreasing process is performed shown in FIG. 14(A) based on the addition ratio K deduced by the addition-ratio calculating portion 109 by the weighted-addition process of an equation (6) so as to generate a tenth image 121 shown in FIG. 19(B) as an output image.

Tenth image 121=(ninth image 120×addition ratio K)+(fifth image 114×(1−addition ratio K)) (6)

As a result, the person 102 in the tenth image 121 becomes an image of which the luminance is higher than that of the person 102 in the first image 100. This generates an image in which the person 101 appears to stand out.

Subsequently, a flowchart for obtaining the tenth image 121 is described.

FIG. 12 shows a flowchart for obtaining the fourth image 112 in the first embodiment. The same figure is used to describe a case that the tenth image 121 in the modified example of the second embodiment is obtained. In this case, in the step S204 of the flowchart in FIG. 12, instead of the blurring process on the first image 100, a process for "performing the luminance decreasing process and the luminance increasing process on the first image 100 so as to generate the fifth image 114 and the ninth image 120" is executed. Further, in the step S205, a process for "performing a weighted addition on the fifth image 114 and the ninth image 120" is executed.

In the above-described description, the image processing portions 113 and 119 perform the luminance decreasing process and the luminance increasing process, respectively, on the first image 100 so as to generate the fifth image 114 and the ninth image 120, respectively. The image composing portion 110 composes the fifth image 114 and the ninth image 120. However, the image processing portions 113 and 119 may perform the luminance decreasing process and the luminance increasing process, respectively, on the second image 103 so as to generate a fifth' image (not shown) and a ninth' image (not shown), respectively, and the image composing portion 110 may compose the fifth' image and the ninth' image. Thereby, it becomes possible to obtain an image that exhibits a similar effect.

This allows the photographer to obtain the tenth image 121 in which the luminance of the person 101 is enhanced, and as a result, the person 101 appears to stand out.

Modification of Third Embodiment

Figure 20:
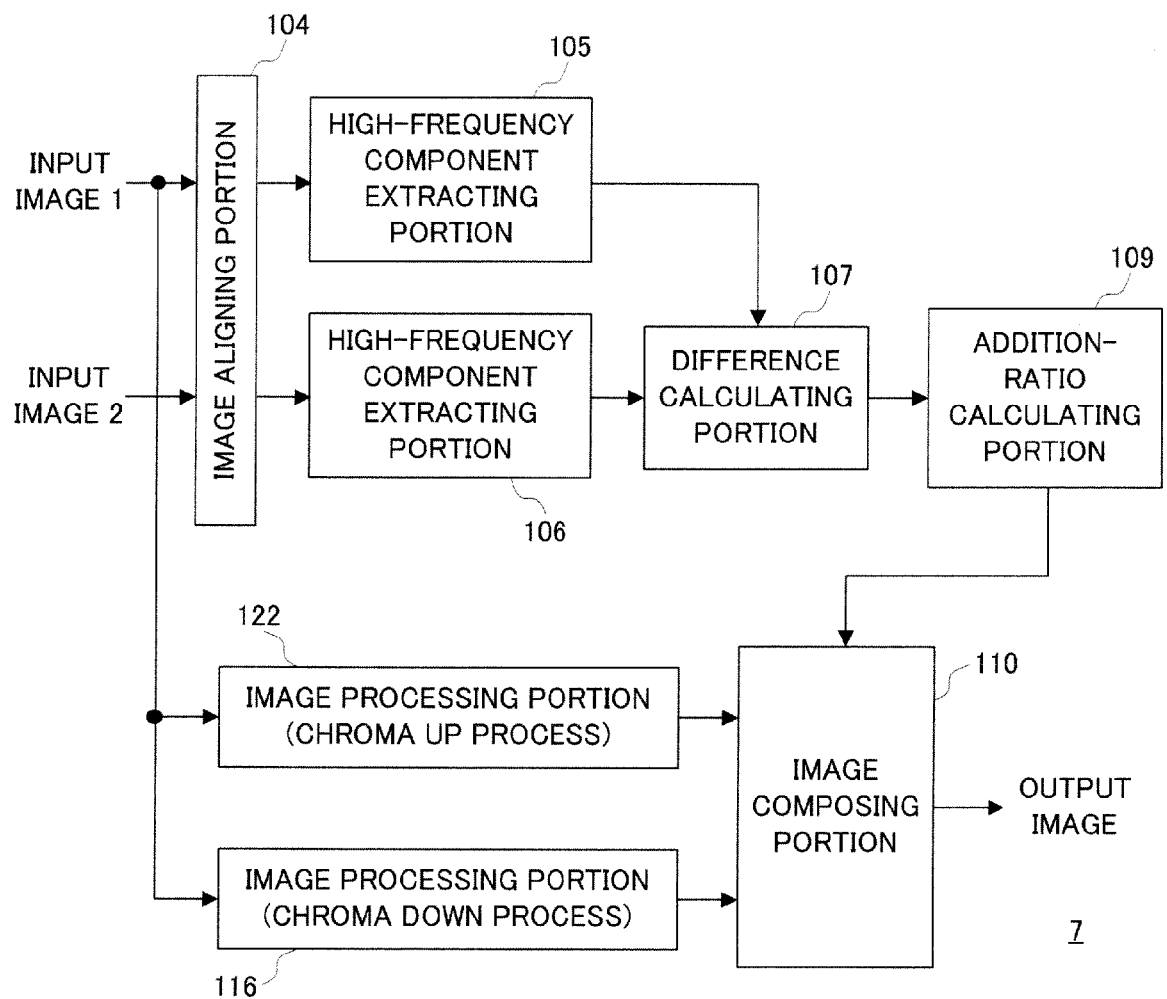
FIG. 20 is a diagram showing a modified example of the image processing portion 7 in the third embodiment.

FIG. 20 is a diagram describing a modified example of the third embodiment.

In FIG. 20, regions allotted with the same numerals as those in FIG. 4 are those having the same functions and operations as those in the first embodiment, and thus, the description of the functions and the operation is omitted.

In FIG. 20, an image processing portion 122 performs a process for exhibiting an effect for increasing the chroma (hereinafter, described as a chroma increasing process) on the first image 100.

Figure 21:
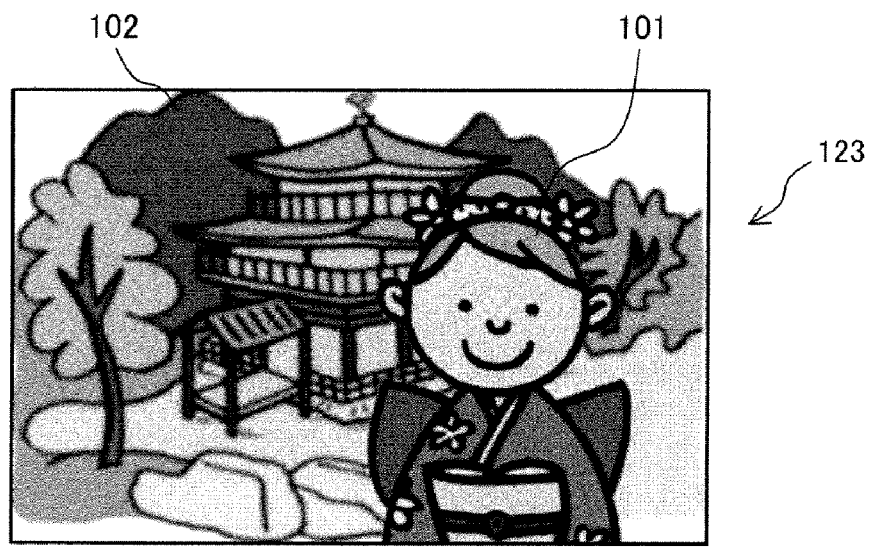
FIG. 21(A) is an imaginary photograph of an image after a chroma up process is performed by an image processing portion 122 in FIG. 20.
FIG. 21(B) is an imaginary photograph of an output image from an image composing portion 110.
Figure 21:
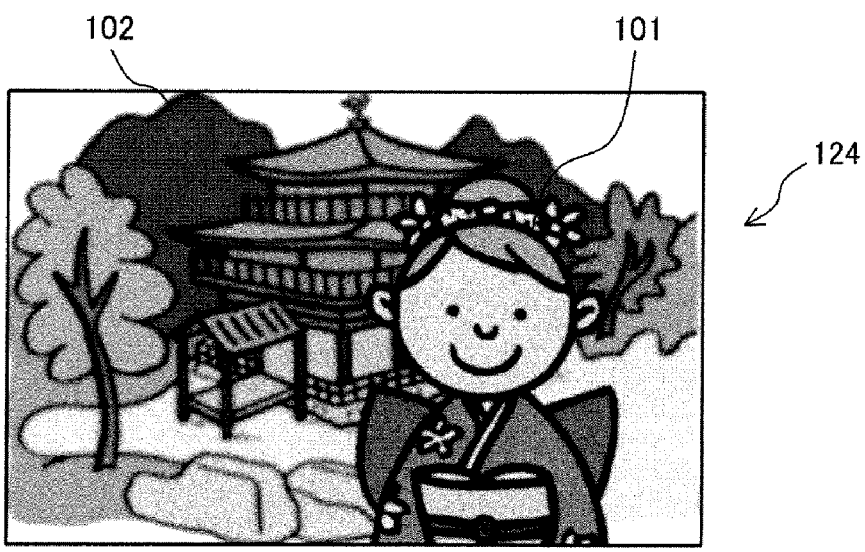

An eleventh image 123 shown in FIG. 21(A) is an imaginary photograph of a case that the chroma increasing process is performed on the first image 100.

The image composing portion 110 composes the eleventh image 123 and the seventh image 117 on which the chroma decreasing process shown in FIG. 17(A) is performed based on the addition ratio K deduced by the addition-ratio calculating portion 109 by the weighted-addition process of an equation (7) so as to generate a twelfth image 124 shown in FIG. 21(B) as an output image.

Twelfth image 124=(eleventh image 123×addition ratio K)+(seventh image 117×(1−addition ratio K)) (7)

As a result, the person 102 in the twelfth image 124 becomes an image of which the chroma is higher than that of the person 102 in the first image 100. This generates an image in which the person 101 appears to stand out.

Subsequently, a flowchart for obtaining the twelfth image 124 is described.

FIG. 12 shows a flowchart for obtaining the fourth image 112 in the first embodiment. The same figure is used to describe a case that the twelfth image 124 of the modification of the third embodiment is obtained. In this case, in the step S204 of the flowchart in FIG. 12, instead of the blurring process on the first image 100, a process for "performing the chroma decreasing process and the chroma increasing process on the first image 100 so as to generate the seventh image 117 and the eleventh image 123" is executed. Further, in the step S205, a process for "performing a weighted addition on the seventh image 117 and the eleventh image 123" is executed.

In the above-described description, the image processing portions 116 and 122 respectively perform the chroma decreasing process and the chroma increasing process on the first image 100 so as to generate the seventh image 117 and the eleventh image 123, respectively. Further, the image composing portion 110 composes the seventh image 117 and the eleventh image 123. However, the image processing portions 116 and 122 may perform the chroma decreasing process and the chroma increasing process, respectively, on the second image 103 so as to generate the seventh' image (not shown) and an eleventh' image (not shown), respectively, and the image composing portion 110 may compose the seventh' image and the eleventh' image. Thereby, it becomes possible to obtain an image that exhibits a similar effect.

This allows the photographer to obtain the twelfth image 124 in which the chroma of the person 101 is enhanced consequently to appear to stand out.

As described above, according to the embodiments of the present invention, the imaging apparatus 1 obtains the input image 1 and the input image 2 as the two photographed images of which the depth of field differs, and inputs the obtained two photographed images to the image processing portion 7. The image processing portion 7 performs on the input image 1 processes for decreasing the level of the image signal (magnitude of the image signal) of the input image 1 such as the blurring process, the luminance decreasing process, and the chroma decreasing process, for example. The image processing portion 7 calculates a degree of difference between the input image 1 and the input image 2, and according to the degree of difference, adds the input image 1 and the image in which the process for decreasing the image signal level is performed on the input image 1, for each pixel. More specifically, the image processing portion 7 adds in such a manner as to increase a proportion of the image in which the process for decreasing the image signal level is performed as the degree of difference is higher. As a result, it becomes possible that the background 102 only is blurred and the luminance is decreased or the chroma is decreased. Thereby, it becomes possible to obtain the photographed image in which the person 101 is emphasized so as to appear to stand out.

Further, as the modification of the embodiments of the present invention, for example, the process for decreasing the level of the image signal of the input image 1 such as the luminance decreasing process, or the chroma decreasing process, etc., is performed on the input image 1 while the process for increasing the level of the image signal of the input image 1 such as the luminance increasing process, or the chroma increasing process, etc., is also performed thereon.

Thereafter, according to the degree of difference between the input image 1 and the input image 2, the image processing portion 7 adds the image in which the process for increasing the image signal level is performed on the input image 1 and the image in which the process for decreasing the image signal level is performed on the input image 1, for each pixel. More specifically, the image processing portion 7 adds in such a manner as to increase a proportion of the image on which the process for decreasing the image signal level is performed as the degree of difference is higher. In contrary, the image processing portion 7 adds in such a manner as to increase a proportion of the image in which the process for increasing the image signal level is performed as the degree of difference is lower. As a result, it becomes possible that the background 102 only is blurred and the luminance is decreased or the chroma is decreased. Thereby, it becomes possible to obtain the photographed image in which the person 101 is emphasized so as to appear to stand out.

It is noted that in the above-described embodiments, as an example of the process for decreasing the level of the image signal, the description is given of the blurring process, the luminance decreasing process, and the chroma decreasing process. However, as long as it is possible to decrease the level of the image signal, any other processes may be used. Two or all of the processes, out of the blurring process, the luminance decreasing process, and the chroma decreasing process, may be simultaneously executed.

Similarly, as the process for increasing the level of the image signal, the description is given of the luminance increasing process or the chroma increasing process. However, as long as it is possible to increase the level of the image signal, any other processes may be used.

Figure 11:
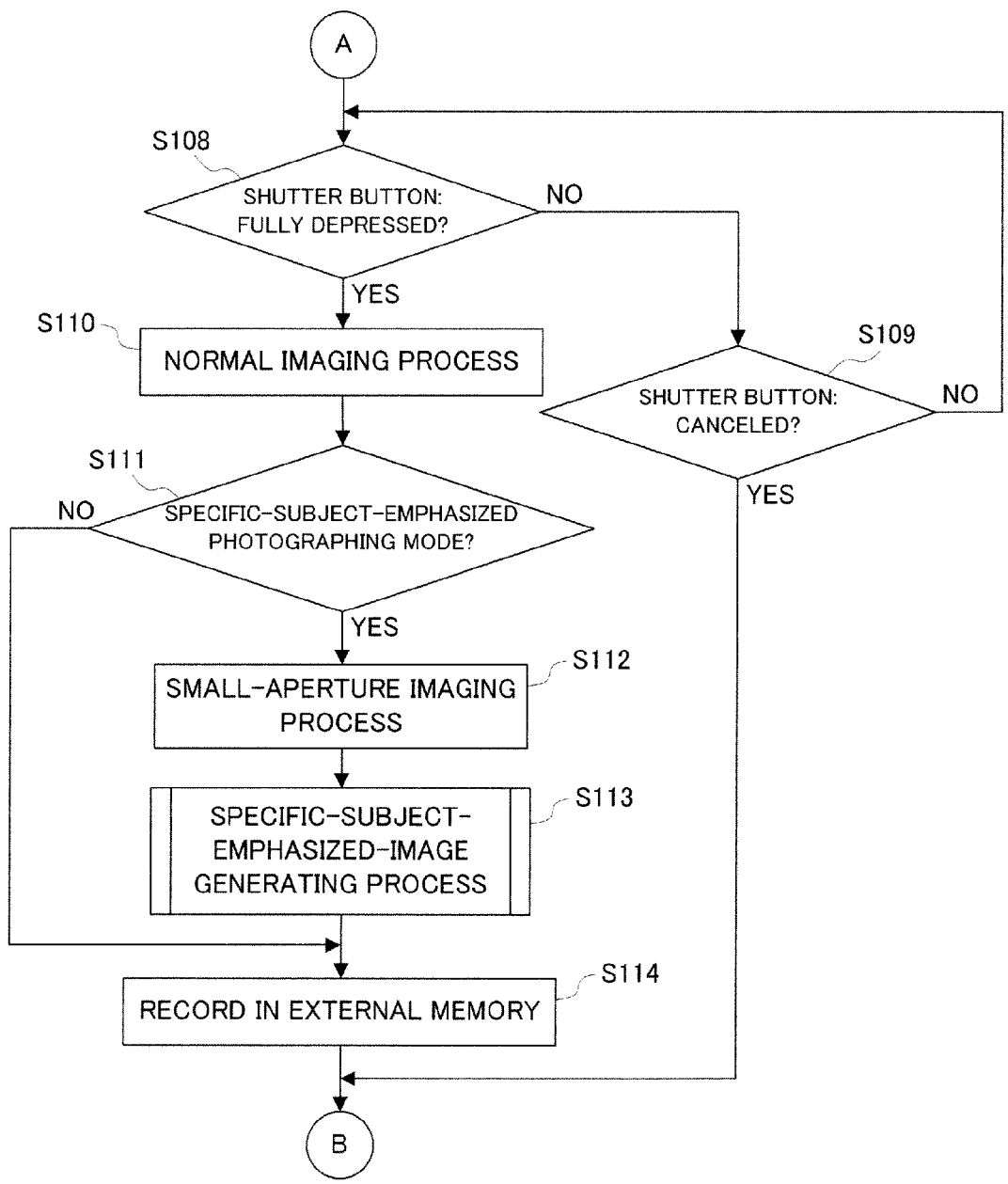
FIG. 11 is a flowchart showing another portion of a procedure for generating the specific-subject-emphasized image in the imaging apparatus in FIG. 1.

Further, in the above-described embodiments, the specific-subject-emphasized image generating process is executed under the photographing mode. However, the specific-subject-emphasized image generating process may be executed under the reproducing mode. In this case, there is a need of partially modifying the flowchart shown in FIG. 11 as shown in FIG. 22, and further, in the reproducing mode, the process needs to be executed according to a flowchart shown in FIG. 23.

Figure 22:
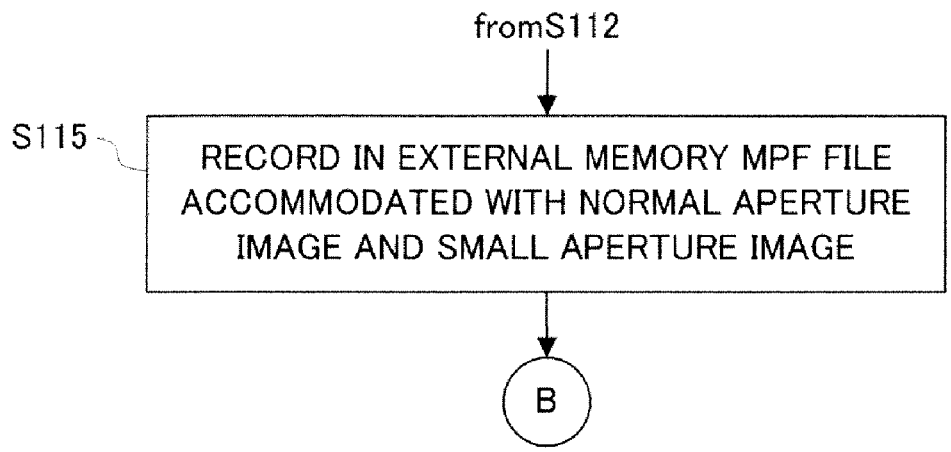
FIG. 22 is one portion of a modified example of a flowchart showing a procedure for generating a specific-subject-emphasized image.

With reference to FIG. 22, upon completion of the process in the step S112, the process proceeds to a step S115. In the step S115, an MPF (Multi Picture Format) file accommodated therein with a normal aperture image acquired by a normal imaging process and a small aperture image acquired by a small aperture imaging process is created, and the created MPF file is recorded in the external memory 22. Upon completion of the process in the step S115, the process returns to the step S102.

Figure 23:
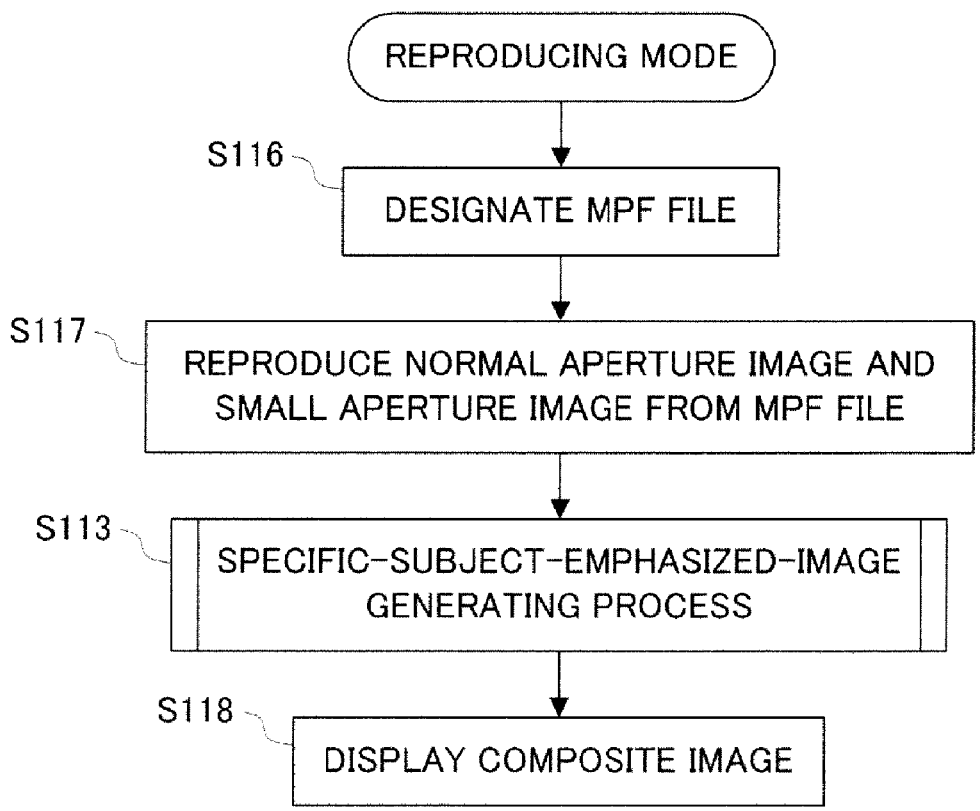
FIG. 23 is another portion of the modified example of the flowchart showing the procedure for generating the specific-subject-emphasized image.

With reference to FIG. 23, the MPF file recorded in the external memory 22 is designated in a step S116, and the normal aperture image and the small aperture image are reproduced from the designated MPF file in a step S117. In the step S113, the reproduced normal aperture image and small aperture image are noticed, and the specific-subject-emphasized image generating process is executed. The composite image thereby generated is displayed in a step S118.

Further, in the above-described embodiments, any of the blurring amount by the image processing portion 108 shown in FIG. 4, the decreasing amount of the luminance by the image processing portion 113 shown in FIG. 13, and the decreasing amount of the chroma by the image processing portion 116 shown in FIG. 15 are uniform. However, it may be possible that the blurring amount, the luminance decreasing amount, or the chroma decreasing amount is imparted with diversity so as to compose the input image 1 and an image having the blurring amount, the luminance decreasing amount, or the chroma decreasing amount of which the amount differs to one another. In this case, the image processing portion 7 needs to be configured as shown in FIG. 24.

Figure 24:
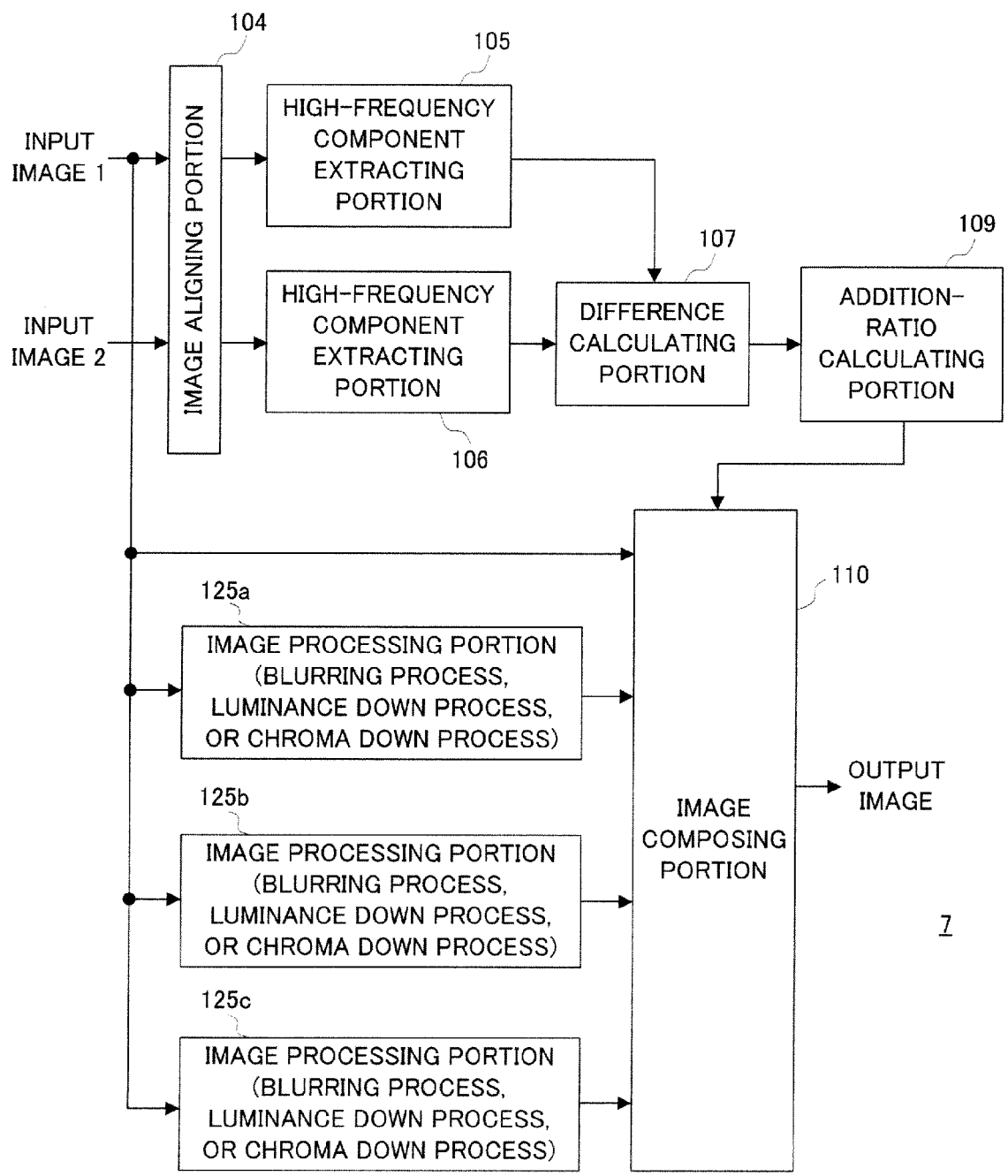
FIG. 24 is a diagram showing a modified example of the image processing portion 7.

According to FIG. 24, the input image 1 is applied to image processing portions 125*a* to 125*c* in a parallel manner. The image processing portions 125*a* to 125*c* execute blurring processes according to blurring amounts different to one another, luminance down processes according to luminance decreasing amounts different to one another, or chroma down processes according to chroma decreasing amounts different to one another. The image composing portion 110 composes the input image 1 and images outputted from the image processing portions 125*a* to 125*c* with reference to output of the addition-ratio calculating portion 109.

Figure 25:
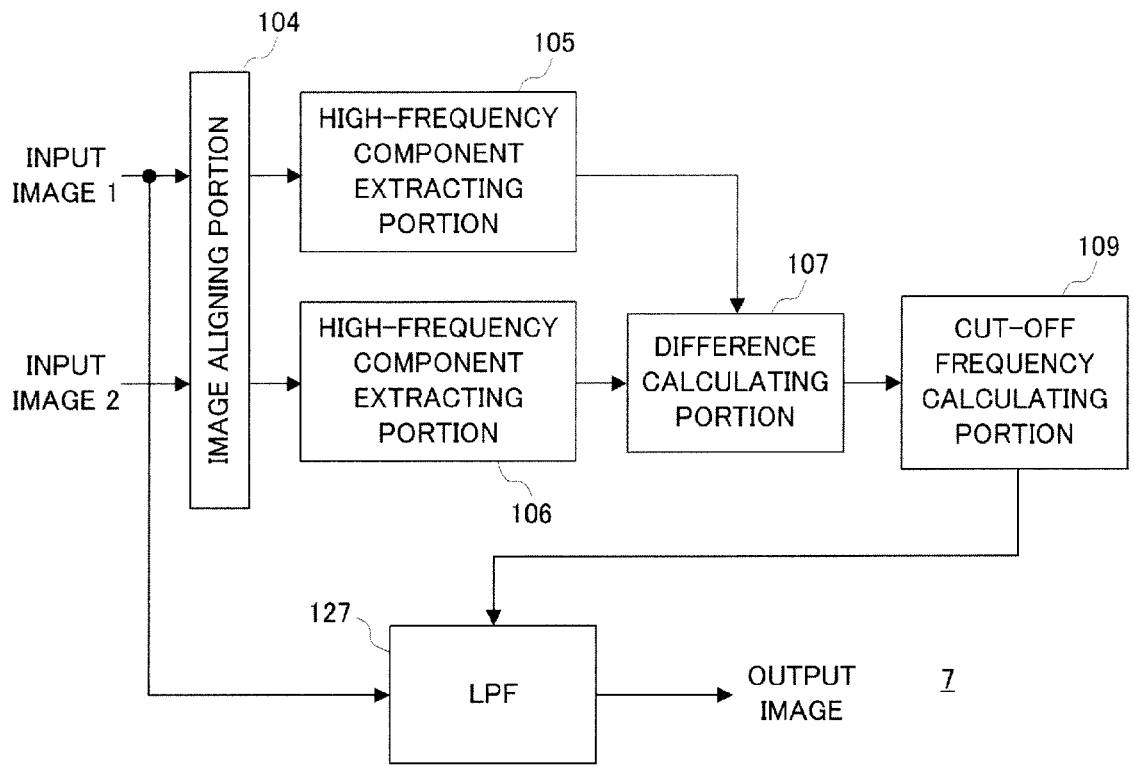
FIG. 25 is a diagram showing another modified example of the image processing portion 7.

In addition, in the image processing portion 7 shown in FIG. 4, the blurring process is performed in the image processing portion 108 while the composing process is to be performed in the image composing portion 110. However, as shown in FIG. 25, the image processing portion 108 and the image composing portion 110 may be replaced with an LPF 127 and the addition-ratio calculating portion 109 may be replaced with a cut-off frequency calculating portion 126 so as to control a cut-off characteristic of the LPF 127 based on a cut-off frequency calculated by the cut-off frequency calculating portion 126.

Figure 26:
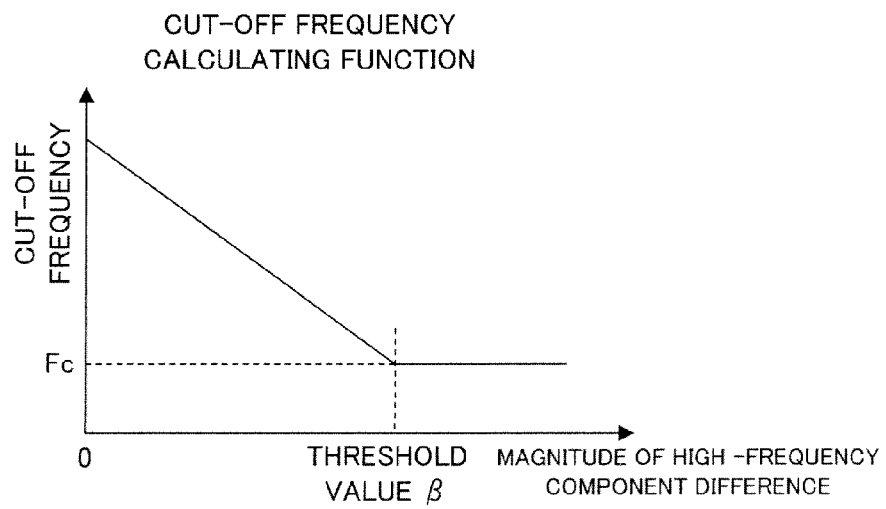
FIG. 26 is a graph showing a function for a cut-off frequency calculation by a cut-off frequency calculating portion in FIG. 25.

In this case, the cut-off frequency is changed according to a manner shown in FIG. 26. That is, the cut-off frequency is lowered according to lowering of the difference signal calculated by the difference calculating portion 107. In a range in which the magnitude of the difference signal falls below the threshold value β, the cut-off frequency is set to "Fc". Thereby, the composite image in which the specific subject is emphasized is outputted from the LPF 127.

Fourth Embodiment

Figure 27:
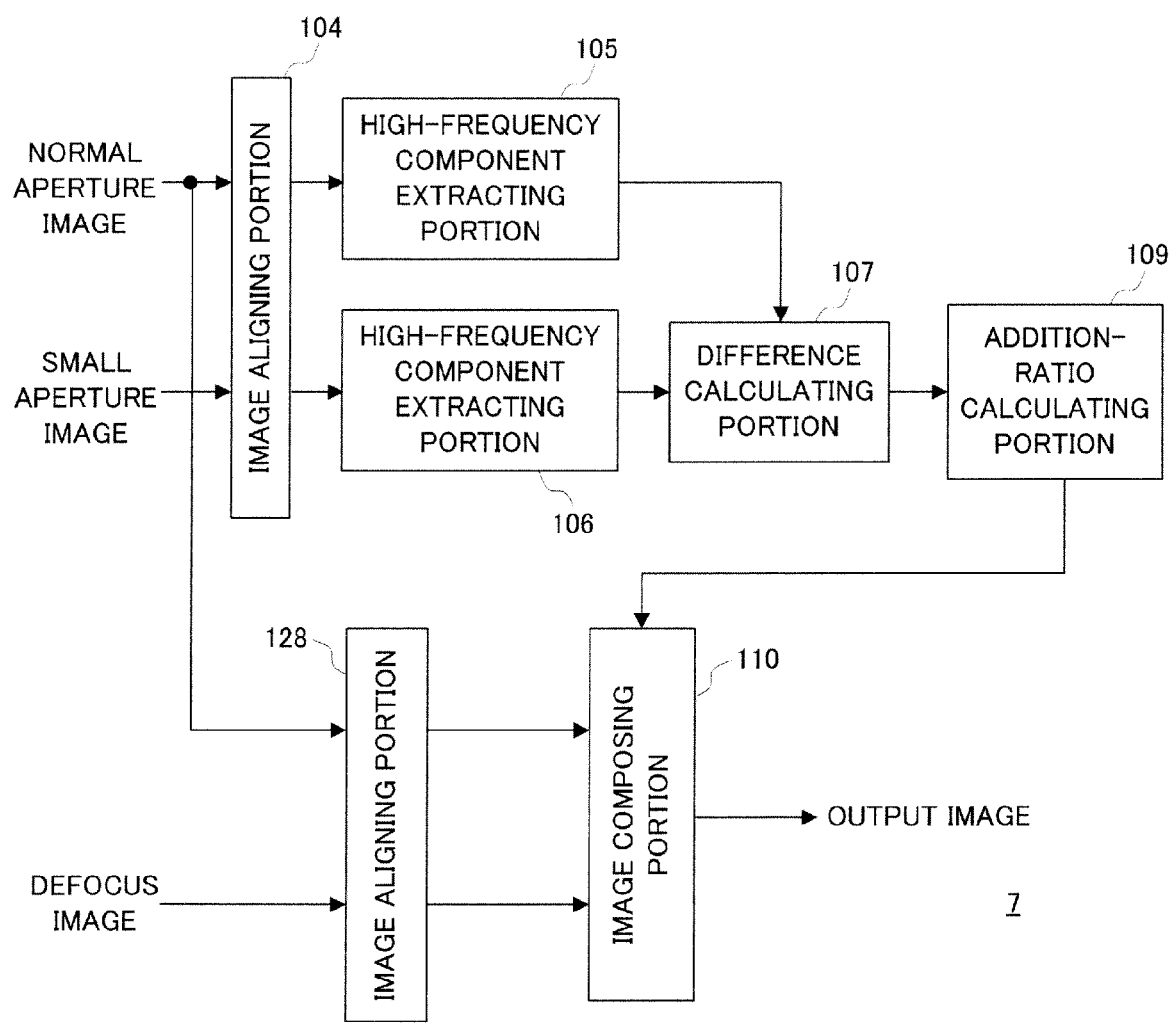
FIG. 27 is a diagram for describing an internal configuration and an image process of the image processing portion 7 in FIG. 1, in a fourth embodiment.

Subsequently, a fourth embodiment is described. FIG. 27 is a diagram for describing a configuration of a portion for performing the specific-subject-emphasized image generating process, out of the configuration provided in the image processing portion 7 according to the first embodiment, and the specific-subject-emphasized image generating process.

In a fourth embodiment, in addition to the normal aperture image acquired under the normal imaging condition and the small aperture image acquired under the small-aperture imaging condition, a defocus image acquired under a defocus imaging condition (an extremely defocused imaging condition) is used.

In FIG. 27, regions allotted with the same numerals as those in FIG. 4 are those having the same functions and operations as those in the first embodiment, and thus, the description of the functions and the operation is omitted.

An image aligning portion 128 has the same configuration as that of the image aligning portion 104, and performs alignment of the normal aperture image and the defocus image. The normal aperture image and the defocus image outputted from the image aligning portion are composed by the image composing portion 110. Upon the composing process, the addition ratio K calculated by the addition-ratio calculating portion 109 is referred.

Next, a method for obtaining an image in which the specific subject is emphasized by using the imaging apparatus 1 according to this embodiment is described.

Figure 28:
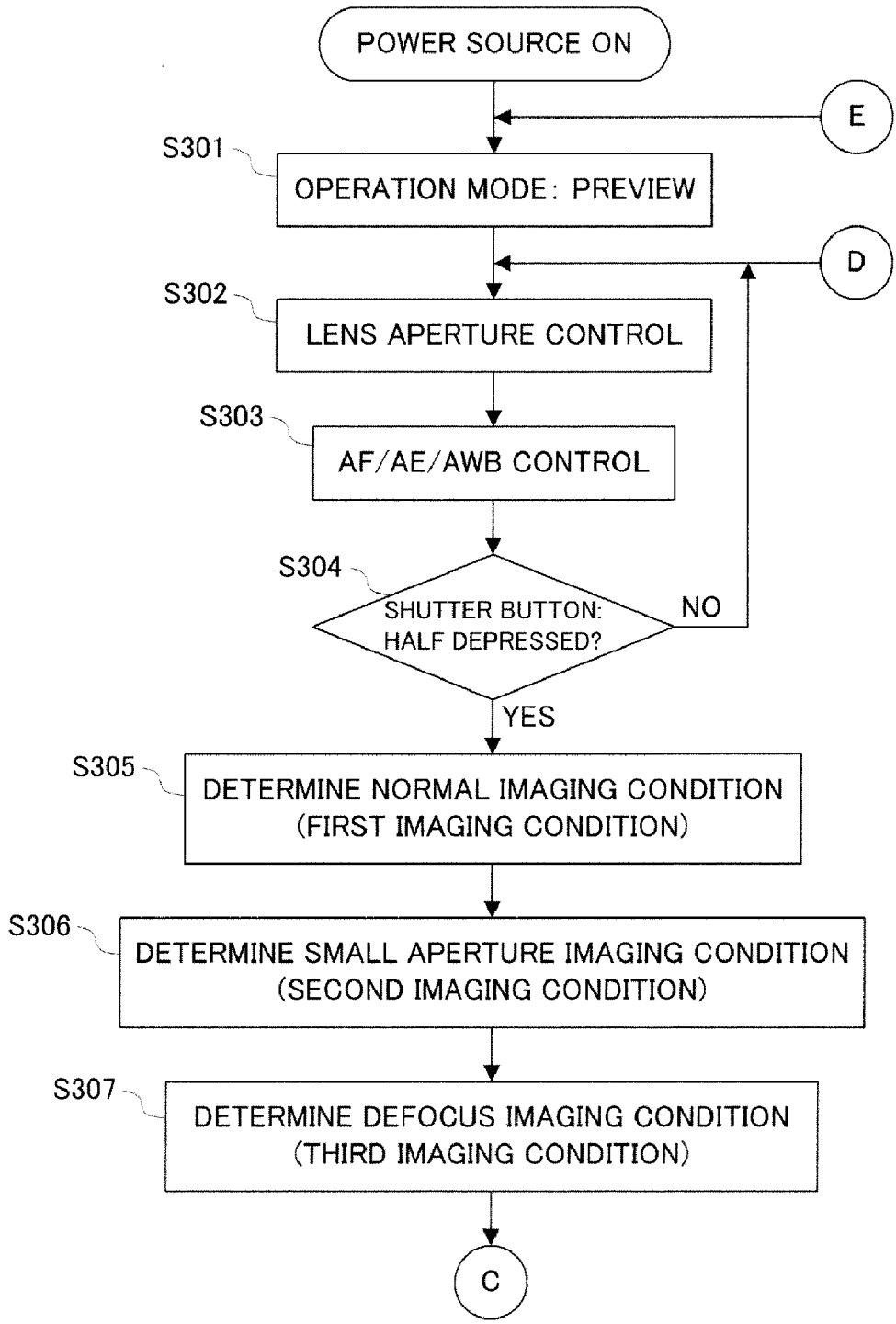
FIG. 28 is a flowchart showing one portion of a procedure for generating a specific-subject-emphasized image, in the fourth embodiment.
Figure 29:
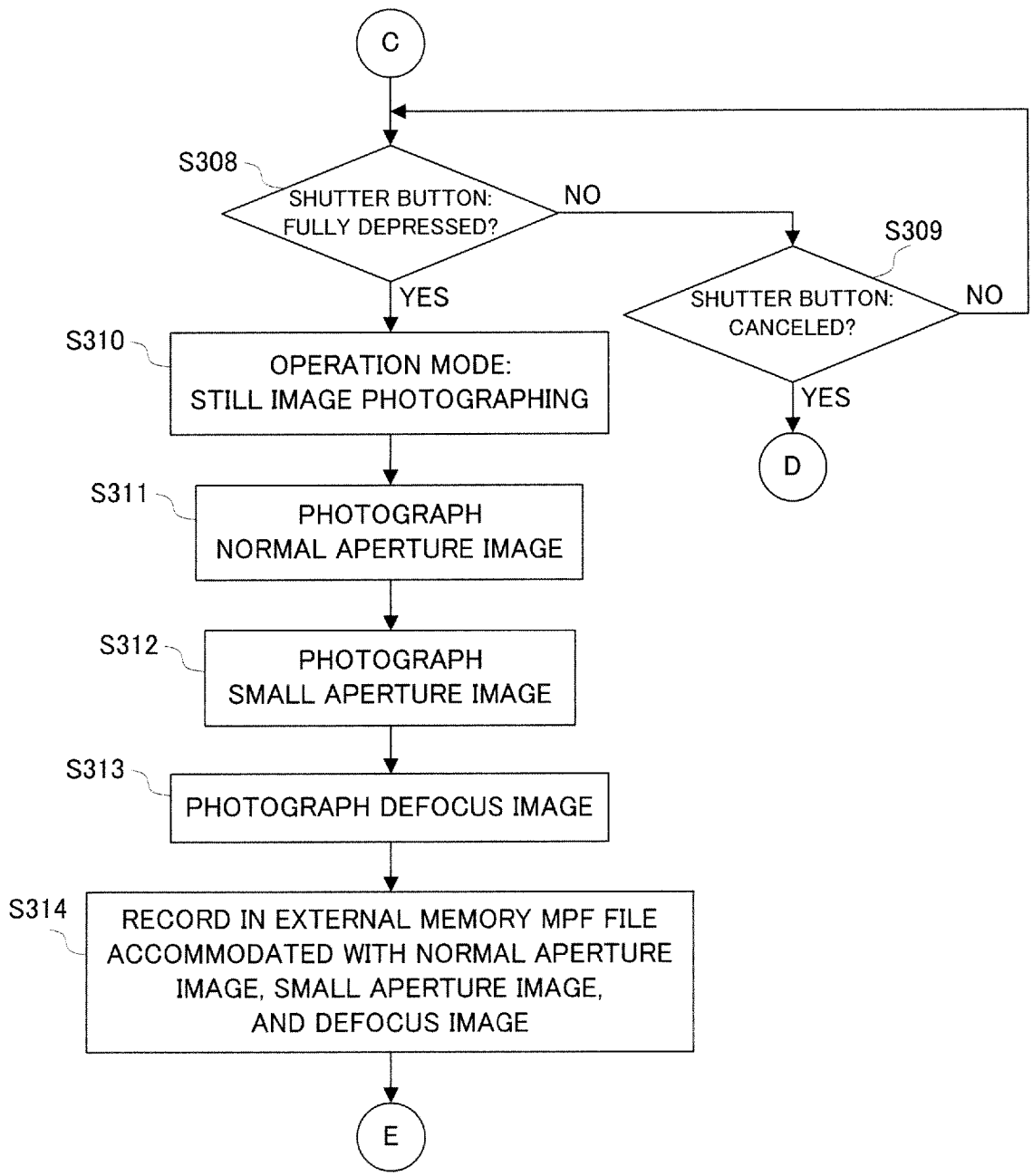
FIG. 29 is a flowchart showing another portion of the procedure for generating the specific-subject-emphasized image, in the fourth embodiment.
Figure 30:
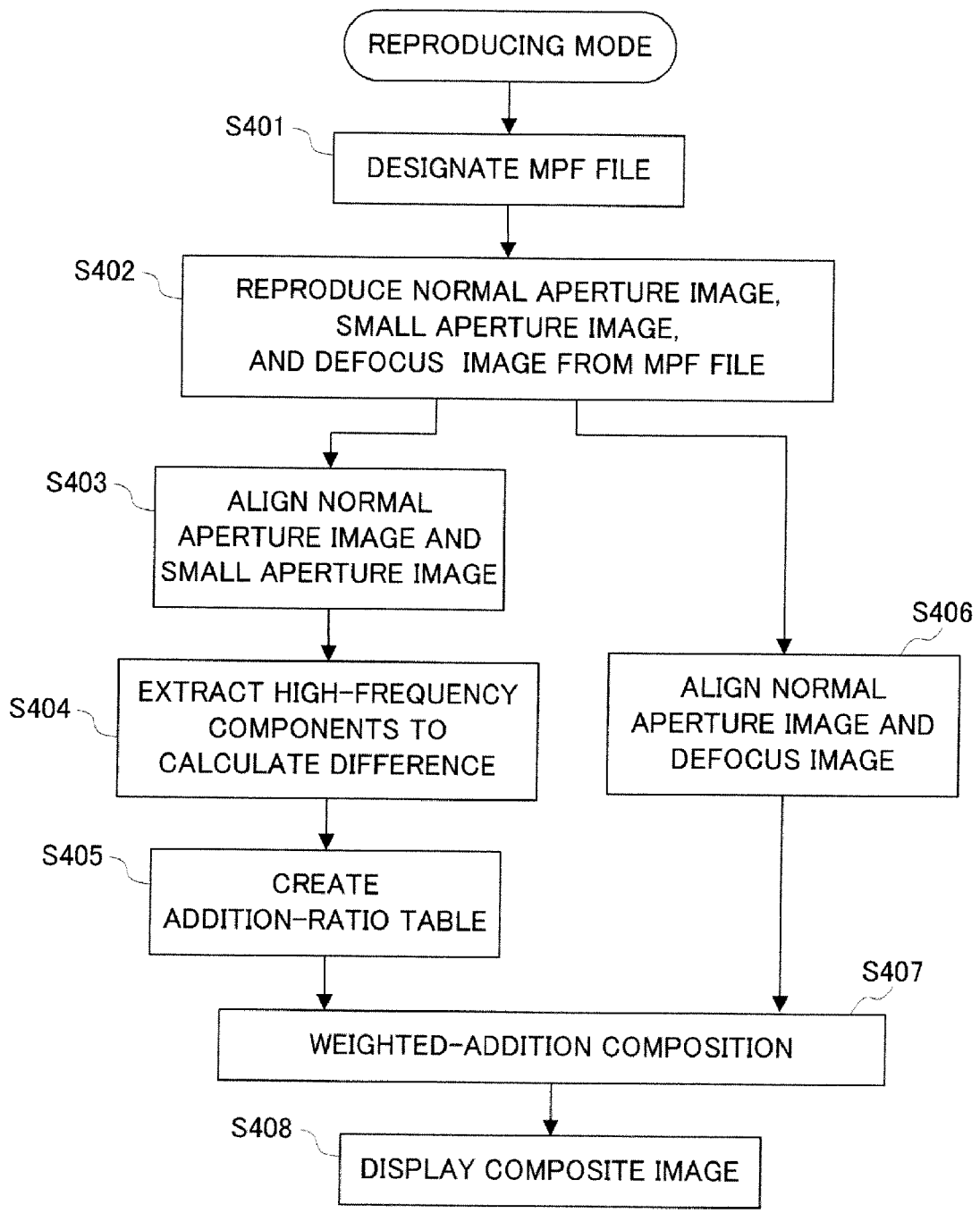
FIG. 30 is a flowchart showing still another portion of the procedure for generating the specific-subject-emphasized image, in the fourth embodiment.

FIG. 28 and FIG. 29 are flowcharts each showing a series of processes in which from the imaging apparatus 1 obtains the normal aperture image, the small aperture image, and the defocus image until the imaging apparatus 1 records the obtained images in the external memory 22. FIG. 30 is a flowchart showing a series of processes in which from a composite image in which the specific subject is emphasized is created based on the normal aperture image, the small aperture image, and the defocus image recorded in the external memory 22 until the composite image is displayed.

It is noted that a control program corresponding to these flowcharts is stored in a flash memory not shown. For an operation of each step described below, the CPU 17 is always involved.

With reference to FIG. 28, an operation mode is set to a preview mode in a step S301, and a zoom magnification and an aperture amount are controlled in response to an operation by a photographer in a step S302. In a step S303, AF control, AE control, and AWB control are executed, and in a step S304, it is determined whether or not a shutter button is half depressed. When NO is determined in the step S304, the process returns to the step S302, and when YES is determined in the step S304, the process proceeds to a step S305.

In the step S305, the normal imaging condition (first imaging condition) is set according to the same manner as that in the step S105 shown in FIG. 10. In a step S306, the small-aperture imaging condition (second imaging condition) is set according to the same manner as that in the step S107 shown in FIG. 10. In a step S307, a defocus imaging condition (third imaging condition) under which a focus is greatly defocused from a subject is set.

It is noted that in each one of steps S305 to S307, the focus is set to a common subject (specific subject) within the object scene. An aperture amount set in the step S307 is the same as that set in the step S305.

In a step S308, it is determined whether or not the shutter button is fully depressed, and in a step S309, it is determined whether or not the operation of the shutter button is canceled. When YES is determined in the step S308, the process proceeds to the step S310, and when YES is determined in the step S309, the process returns to the step S302.

In the step S310, the operation mode is set to a still image photographing mode, and in a step S311, the first imaging condition is referred to photograph the normal aperture image. In a step S312, the second imaging condition is referred to photograph the small aperture image, and in a step S313, the third imaging condition is referred to photograph the defocus image. In a step S314, the normal aperture image, the small aperture image, and the defocus image thus acquired are accommodated in an MPF file, and the MPF file is recorded in the external memory 22. Upon completion of the process in the step S314, the process returns to the step S301.

With reference to FIG. 30, in a step S401 the MPF file recorded in the external memory 22 is designated. In a step S402, the normal aperture image, the small aperture image, and the defocus image are reproduced from the designated MPF file. The normal aperture image and the small aperture image are subjected to the aligning process by the aligning portion 104 in a step S403.

In a step S404, a high-frequency component of the normal aperture image outputted from the aligning portion 104 is extracted by the high-frequency-component extracting portion 105, and a high-frequency component of the small aperture image outputted from the aligning portion 104 is extracted by the high-frequency-component extracting portion 106. A difference between the extracted high-frequency components is calculated by the difference calculating portion 107. In a step S405, a calculating process of the addition ratio K in which the calculated difference is referred is executed by the addition-ratio calculating portion 109. Thereby, an addition ratio table is created.

On the other hand, in a step S406, the reproduced normal aperture image and the defocus image are subjected to the aligning process by the aligning portion 104. In a step S407, the normal aperture image and the defocus image outputted from the aligning portion 104 are composed by the image composing portion 110. At this time, the addition ratio table created in the step S405 is referred. The composite image outputted from the image composing portion 110 is outputted from the display portion 13 in a step S408.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An imaging apparatus, comprising:
   an imager which captures a target scene including a plurality of objects in such a manner that a same object comes into focus and a depth of field is different, so as to acquire a first image signal and a second image signal representing two scene images;
   an image creator which creates a third image signal by subjecting the first image signal to a process for reducing a level of the first image signal; and
   a composite image creator which creates a composite image signal by adding the first image signal to the third image signal in such a manner that a ratio of the third image signal to the first image signal is increased as a difference of a high frequency component between the first image signal and the second image signal increase.

2. The imaging apparatus according to claim 1, wherein said image creator performs a blurring process on the first image signal.

3. The imaging apparatus according to claim 1, wherein said composite image creator adds the first image signal to the third image signal in such a manner that a ratio of the third image signal to the first image signal is increased as a difference of a high frequency component in each pixel between the first image signal and the third image signal increases.

4. An imaging apparatus, comprising:
   an imager which captures a target scene including a specific object and a background in such a manner that a focus position is different, so as to acquire a first image signal and a second image signal representing two scene images;
   an image creator which creates a third image signal in which a blurring process is performed on the background appearing in the first image of signal of the target scene, or a degree of blurring of the background appearing in the first image signal of the target scene is emphasized, based on a difference between the first image signal and the second image signal, wherein said image creator performs the blurring process in such a manner that the degree of blurring is increased as the difference increases, or emphasizes the degree of blurring as the difference increases.

* * * * *